United States Patent
Baggott et al.

(10) Patent No.: US 9,852,041 B2
(45) Date of Patent: Dec. 26, 2017

(54) SYSTEMS AND METHODS FOR CATEGORIZING EXCEPTIONS AND LOGS

(71) Applicant: Microsoft Technology Licensing, LLC, Redmond, WA (US)

(72) Inventors: Nicholas Baggott, Mountain View, CA (US); Badrinath K. Sridharan, Saratoga, CA (US); Toon Sripatanaskul, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/042,461

(22) Filed: Sep. 30, 2013

(65) Prior Publication Data

US 2015/0095338 A1    Apr. 2, 2015

Related U.S. Application Data

(63) Continuation-in-part of application No. 14/040,470, filed on Sep. 27, 2013.

(51) Int. Cl.
| | | |
|---|---|---|
| *G06F 7/00* | (2006.01) | |
| *G06F 17/30* | (2006.01) | |
| *G06F 11/30* | (2006.01) | |
| *G06F 11/34* | (2006.01) | |

(52) U.S. Cl.
CPC ...... *G06F 11/3072* (2013.01); *G06F 11/3476* (2013.01); *G06F 11/3409* (2013.01); *G06F 11/3442* (2013.01); *G06F 11/3452* (2013.01); *G06F 2201/86* (2013.01)

(58) Field of Classification Search
CPC ....... H01L 2924/00014; G06F 11/3636; G06F 11/3466; G06F 11/3688; G06F 2201/865

USPC .......................................................... 707/740
See application file for complete search history.

(56) References Cited

U.S. PATENT DOCUMENTS

| | | | |
|---|---|---|---|
| 7,072,796 B2 | 7/2006 | Kataoka | |
| 7,673,298 B2 | 3/2010 | Oyama | |
| 8,219,983 B1 | 7/2012 | Sobel et al. | |
| 8,255,902 B1 | 8/2012 | Satish | |
| 2008/0162946 A1* | 7/2008 | Lohman et al. | 713/193 |
| 2009/0013208 A1* | 1/2009 | DiMuzio | G06F 9/4812 714/2 |
| 2010/0154027 A1 | 6/2010 | Sobel et al. | |
| 2010/0318986 A1 | 12/2010 | Burke et al. | |

(Continued)

OTHER PUBLICATIONS

"U.S. Appl. No. 14/040,470, Final Office Action dated Aug. 11, 2015", 27 pgs.

(Continued)

*Primary Examiner* — Syed Hasan
*Assistant Examiner* — Nicholas Allen
(74) *Attorney, Agent, or Firm* — Schwegman Lundberg & Woessner, P.A.

(57) ABSTRACT

Techniques for categorizing exceptions and logs are described. For example, exception data of an exception that occurred on a machine is accessed. The exception data includes a stack trace of the exception. A determination is made that the exception is unique based on the stack track of the exception. Responsive to the determination that the exception is unique, the exception is categorized, by a machine including a memory and at least one processor, into one or more categories based on the stack trace of the exception.

18 Claims, 9 Drawing Sheets

(56) References Cited

U.S. PATENT DOCUMENTS

| | | | | |
|---|---|---|---|---|
| 2011/0138363 A1* | 6/2011 | Schmelter | ........... | G06F 11/3636 717/128 |
| 2011/0138366 A1* | 6/2011 | Wintergerst | ........ | G06F 11/3409 717/130 |
| 2011/0283266 A1* | 11/2011 | Gallagher | ................. | G06F 9/44 717/130 |
| 2011/0307828 A1* | 12/2011 | Chilimbi et al. | ............. | 715/802 |
| 2012/0102488 A1* | 4/2012 | Wintergerst et al. | ............. | 718/1 |
| 2012/0144374 A1* | 6/2012 | Gallagher | ............. | G06F 11/362 717/128 |
| 2013/0031094 A1* | 1/2013 | Kozak | ........................... | 707/737 |
| 2013/0036407 A1* | 2/2013 | Zheng | ................. | G06F 11/0709 717/135 |
| 2013/0047141 A1* | 2/2013 | Shann | ................. | G06F 11/3664 717/128 |
| 2015/0095892 A1 | 4/2015 | Baggott et al. | | |

OTHER PUBLICATIONS

"U.S. Appl. No. 14/040,470, Non Final Office Action dated Nov. 20, 2014", 22 pgs.

"U.S. Appl. No. 14/040,470, Resonse filed Apr. 20, 2015 to Non-Final Office Action dated Nov. 20, 2014", 33 pgs.

Brylow, et al., "Static Checking of Interrupt-driven Software", IEEE, (2001), 10 pgs.

Corsaro, et al., "Evaluating Real-Time Java Features and Performance for Real-time Embedded Systems", IEEE, (2002), 11 pgs.

Csallner, et al., "Jcrasher : an automatic robustness tester for Java", Wiley, (2004), 27 pgs.

Garousi, Vahid, et al., "Traffic-aware Stress Testing of Distributed Systems Based on UML Models", (Sep. 2005), 174 pgs.

Land, et al., "An Empirical Study of Software Quality Improvement Practices From Multiple Perspectives", AIS Electronic Library (AISeL), (2007), 15 pgs.

Mullen, Robert E, "The Lognormal Distribution of Software Failure Rates : Application to Software Reliability Growth Modeling", IEEE, (1998), 9 pgs.

Wu, et al., "AGARIC—a Hybrid Cloud based Testing Platform", IEEE, (2011), 8 pgs.

"U.S. Appl. No. 14/040,470, Response filed Oct. 13, 2015 to Final Office Action dated Aug. 11, 2015", 20 pgs.

"U.S. Appl. No. 14/040,470, Response filed Apr. 15, 2016 to Non Final Office Action dated Jan. 15, 2016", 20 pgs.

"U.S. Appl. No. 14/040,470, Non-Final Office Action dated Jan. 15, 2016", 27 pgs.

"U.S. Appl. No. 14/040,470, Final Office Action dated Jul. 28, 2016", 28 pgs.

\* cited by examiner

| EXCEPTION CATEGORY ID 1001 | STRIPPED STACK TRACE 1002 | PRIMARY HASH CODE 1003 | SECONDARY HASH CODE 1004 |
|---|---|---|---|
| 1 | ... ... ... | 123 | 123 |
| 2 | ... ... ... ----- | 456 | 123 |

1100

| EXCEPTION CATEGORY ID 1101 | EXCEPTION COUNT 1102 | TIME 1103 | MACHINE ID 1104 |
|---|---|---|---|
| 1 | 2 | 11:01 | 1 |
| 2 | 1 | 11:01 | 3 |
| 1 | 3 | 11:05 | 2 |

| MACHINE ID 1201 | MACHINE NAME 1202 | SERVICE ID 1203 |
|---|---|---|
| 1 | MACHINE ALPHA | SERVICE X |
| 2 | MACHINE BETA | SERVICE X |
| 3 | MACHINE OMEGA | SERVICE X |

*FIG. 12*

SYSTEMS AND METHODS FOR CATEGORIZING EXCEPTIONS AND LOGS

RELATED APPLICATIONS

This application is a Continuation-in-Part of U.S. application Ser. No. 14/040,470, filed on Sep. 27, 2013, which is incorporated herein by reference in its entirety.

TECHNICAL FIELD

The present disclosure generally relates to data processing systems. More specifically, the present disclosure relates to methods, systems, and computer program products for categorizing exceptions and logs.

BACKGROUND

Some companies use one or more development environments, test environments, verification environments, and production environments during a product development lifecycle of a product. Examples of a product are a software product, a software-as-a-service ("SaaS") product, or a hardware product. An environment used in the product development lifecycle usually includes a particular configuration of hardware, software, and operating system. Various environments (also called "fabrics") comprise one or more physical or virtual machines, as well as certain software, that are dedicated to a particular purpose or functionality. At different times in the product development lifecycle, the functionality of a product may be tested based on collecting and analyzing performance data of the hardware, the application or service, the network, the database, etc. that are part of an environment. The performance data may be in the form of logs or exceptions that are captured, for example, during the execution of a piece of software code, the running of a service, or the occurrence of hardware- or configuration-related events. An exception is an anomalous or exceptional event that requires special processing. Traditionally, companies access log files from a production system, index the logs using an indexer, and allow users to browse the logs. An exception or log repository that includes large numbers of exceptions or log files generated in a number of environments may be hard to manage and slow to access. The storing of numerous copies of the same (or similar) exceptions or logs may also complicate the task of deriving useful information based on the exception or log data stored in the repository.

DESCRIPTION OF THE DRAWINGS

Some embodiments are illustrated by way of example and not limitation in the FIGS. of the accompanying drawings, in which:

FIG. 9 is a functional representation of an example exception and log categorizing system, according to various example embodiments;

FIGS. 10-12 are table diagrams illustrating an example categorization of exceptions.

DETAILED DESCRIPTION

Figure 1:
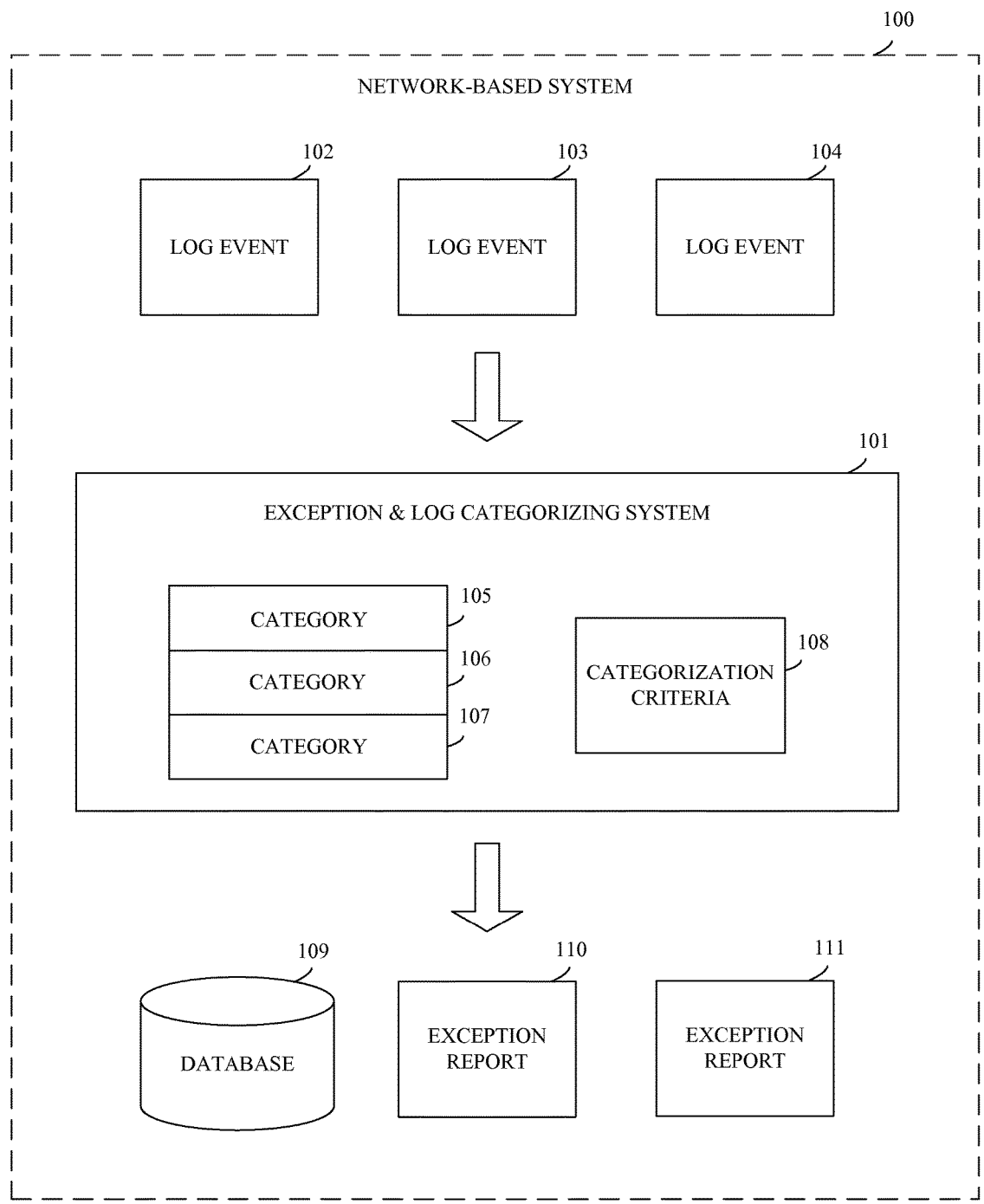
FIG. 1 is a functional representation of an example exception and log categorizing system, according to various example embodiments.

The present disclosure describes methods, systems, and computer program products for categorizing exceptions and logs. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

In some example embodiments, an exception and log categorizing system categorizes exceptions into categories based on a variety of categorization criteria. For example, an exception may be categorized based on the stack trace data of the exception. The exception may also be categorized based on the machine where the exception occurred, the time when the exception occurred, the type of exception, the service that generated the exception, etc. In certain example embodiments, the exception and log categorization system is an API server that provides query access to a database of categorized exceptions. The exception and log categorizing system may generate exception reports that include exception information, such as the number of similar exceptions of a certain category. The exception reports may be generated automatically at a predetermined time, in response to a particular triggering event, or in response to queries (e.g., from a user).

The exception and log categorizing system may access exception data or log data (e.g., receive as input events a number of exceptions or logs), and categorize the exceptions or logs based on one or more rules of categorization of exception data or log data. Information about the categorized exceptions or logs may be provided as input or as reports by the exception and log categorizing system to other automated systems or to users (e.g., engineers). The categorizing of exceptions based on the stack traces of the exceptions may allow the identification of similar exceptions that may point to a particular problem with a machine or service. The categorizing of exceptions based on the stack traces of the exceptions may also allow for more efficient storage of data and management of a database, and for faster queries and query responses to and from the database.

In some example embodiments, the categorizing performed by the exception and log categorizing system is based on matching similar data elements (properties or attributes) within the exceptions or within the logs. For example, two exceptions may be assigned to a particular category based on a determination that the two exceptions have similar stack traces. The exception and log categorizing system may also identify exceptions and logs that are the same kind of exception or log, are duplicates, or point to the same problem.

Furthermore, the exception and log categorizing system stores a single copy (or instance) of the many logs or exceptions that are similar or identical in a record of a database. In some example embodiments, the exception and log categorizing system stores the one copy of the exception or log upon determining that the exception or log has not been previously stored in a record. The storing of a single copy of a plurality of copies of an exception or log may allow the database that stores exceptions and logs to remain small. Furthermore, this storage mechanism of the exception and log categorizing system may allow the queries into the exceptions and logs database to be serviced faster. In addition to classifying the logs and exceptions in terms of uniqueness (e.g., the second event is like the first event), the exception and log categorizing system may count the instances of exceptions or logs that share a particular attribute and record that count along with other data pertinent to the exception. Other data pertinent to the exception may include the time(s) when the exceptions occurred or the logs were generated, the machines were the exceptions occurred or the logs were generated, the services that generated the exceptions or the logs, etc.

In some example embodiments, before categorizing an exception, the exception and log system identifies the exception by a unique hash code calculated based on the exception's normalized stack trace and associated with the exception. According to certain example embodiments, a stack trace is normalized by removing line numbers, recursion, and dynamically generated class names from the full stack trace of the exception. The hash code associated with the exception may be calculated based on applying a hash (e.g., a message digest algorithm 5) function to the normalized (e.g., stripped) stack trace. The exception and log system may assign exceptions to a particular category based on the exceptions being associated with the same hash code.

In certain example embodiments, the exception and log system may perform additional secondary hash calculations for each exception based on discarding additional data from the normalized stack traces of the exceptions. Examples of stack trace data to which the hash function may be applied to calculate secondary hash calculations are: "inner stack trace only", "outer stack trace only", "top five lines of stack trace only", etc. The resulting secondary hash codes may allow for further categorization of the exceptions, for finding similar exceptions (e.g. the same nested exception appears in different places), and for identifying new exceptions that are unlike any existing exceptions and that may deserve special attention.

FIG. 1 is a functional representation of an example exception and log categorizing system 101 for categorizing an exception into one or more categories based on the stack trace of the exception, according to various example embodiments. In some example embodiments, the exception and log categorizing system 101 is included in a network-based system 100. As described in more detail below, the exception and log categorizing system 101 may access (e.g., receive) exception data of an exception. According to certain example embodiments, the exception and log categorizing system 101 uses an Apache Kafka messaging system to receive data that pertains to exceptions from monitored remote machines. When an exception occurs at a remote machine, the exception may be parsed into a log event, e.g., a JSON-format event, and may be published into the Kafka messaging system. The structure (e.g., content) of each log event may follow the same format standardized across the remote machines. Each log event may contain the hostname of the remote machine, the time when the exception happened, and the full (e.g., unmodified) exception stack trace.

Upon accessing the exception data (e.g., log event 102, log event 103, log event 104, etc.) of an exception that occurred on a machine, the exception and log categorizing system 101 automatically analyses and determines, using at least one computer processor, that the exception is unique based on the stack trace of the exception. In some example embodiments, the determination that the exception is unique is made based on examining one or more records of a database to determine whether the one or more records include any exception data pertaining to the exception.

Responsive to the determining that the exception is unique, the exception and log categorizing system 101 may automatically categorize the exception into one or more categories (e.g., category 105, category 106, category 107, etc.) based on a categorization criterion 108 (e.g., the stack trace of the exception, machine, exception type, service that generated the exception, timestamp of the exception, etc.) In some example embodiments, the exception and log categorizing system 101 may categorize the exception into one or more categories according to one or more rules of categorization of exceptions. A rule of categorization of exceptions may, in some instances, combine several categorization criteria 108. For example, a categorization rule may specify that all exceptions that include a particular stack trace and that occurred on a particular machine at a particular time may be assigned to a particular category of exceptions. The categorization rule may also provide that the particular category of exceptions may be prioritized (e.g., marked or tagged as urgent) for purposes of analysis or ticket generation.

Upon assigning the exception to one or more categories, the exception and log categorizing system 101 may generate an exception report (e.g., exception report 110 or exception report 111). In some example embodiments, the exception report alerts a user that a new unique exception occurred, for example, an exception that has not been stored in a record of the database 109. In certain example embodiments, the exception report may include a classification and a count of exceptions. The exception report may be generated automatically (e.g., at a predetermined time or when triggered by an event) or in response to a request received from a device of a user.

Figure 2:
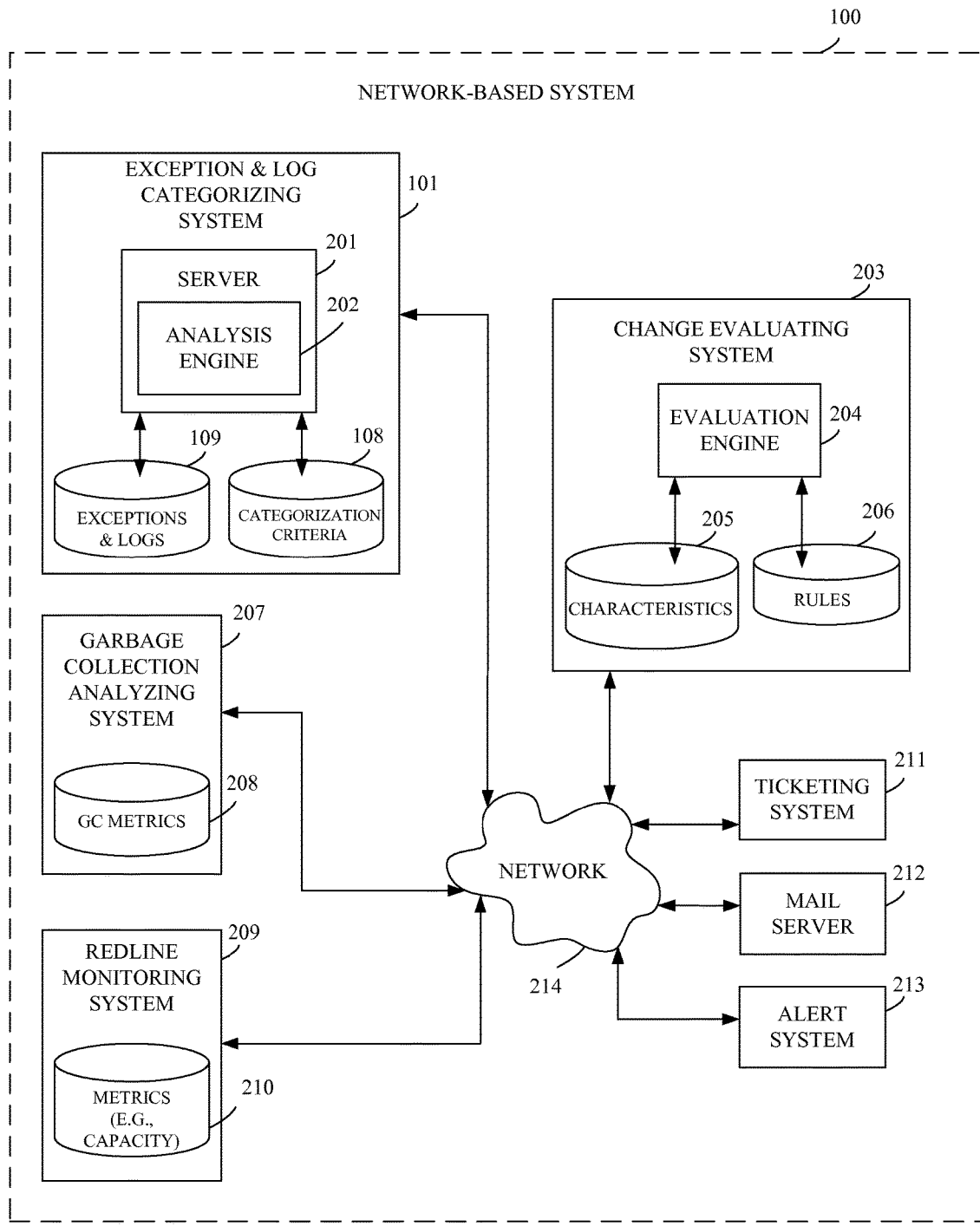
FIG. 2 is a network diagram depicting an example network environment, within which various example embodiments of an exception and log categorizing system may be deployed.

FIG. 2 is a network diagram depicting an example network environment 100, within which various example embodiments of an exception and log categorizing system may be deployed. The network environment 100 includes an exception and log categorizing system 101, a change evaluating system 203, a garbage collection analyzing system 207, a redline monitoring system 209, a ticketing system 211, a mail server 212, and an alert system 213, all communicatively coupled to each other through a network 214. The exception and log categorizing system 101, the change evaluating system 203, the garbage collection analyzing system 207, the redline monitoring system 209, the ticketing system 211, the mail server 212, and the alert system 213 may each be implemented in a computer system, in whole or in part, as described below with respect to FIG. 13.

As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a change evaluating system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements.

The exception and log categorizing system 101 may, in some example embodiments, include a server 201 which may be communicatively coupled to other machines, servers, or devices of the network-based system 100. The server 201 may include an analysis engine 202, which may include one or more modules for categorizing an exception or a log into one or more categories. In some example embodiments, the server 201 may be communicatively coupled to an exceptions and logs database 109 and to a categorization criteria database 108. The exceptions and logs database 109 may store instances or exceptions and logs, as well as categories of exceptions, categories of logs, counts of exceptions, and counts of logs. The exceptions and logs database 109 and the categorization criteria database 108 may reside on one or more physical or virtual machines.

The exception and log categorizing system 101 may access (or receive) exception data or log data from various monitored remote machines used within the environments of an organization. The exception data or log data pertains to the performance of services and machines. The exception or log data may be accessed by the exception and log categorizing system 101 using any of the methods known to those of ordinary skill in the art. In some example embodiments, the push method or the pull method of transmitting data is employed between the exception and log categorizing system 101 and the remote machines were the exceptions occur or the logs are generated.

Using the accessed (or received) exception data or log data, the exception and log categorizing system 101 may categorize the exceptions or logs based on one or more categorization criteria 108 or based on rules of categorization of exception data or log data. Information about the categorized exceptions or logs may be provided as input by the exception and log categorizing system to users (e.g., engineers) or to automated systems, such as the change evaluating system 203, the garbage collection analyzing system 207, the redline monitoring system 209, the ticketing system 211, mail server 212, and the alert system 213.

As discussed above, in some example embodiments, the categorizing performed by the exception and log categorizing system is based on matching similar data elements (properties or attributes) within the exceptions or within the logs. For example, two exceptions may be assigned to a particular category based on a determination that the two exceptions have similar stack traces. The exception and log categorizing system stores only one copy (or instance) of the many logs or exceptions that are the same (e.g., point to the same problem) in a record of the exceptions and logs database 109. The copy of the exception may be stored in association with one or more categories in the record of the exceptions and logs database 109. In addition to classifying the logs and exceptions in terms of uniqueness (e.g., the second event is like the first event), the exception and log categorizing system 101 may generate and maintain one or more exception counts that count the number of exceptions that share a particular attribute (e.g., stack trace similarity, same exception type, the time the exceptions occurred, the machine where the exceptions occurred, the service that generated the exception, etc.)

In some example embodiments, the exception and log categorizing system 205 may, upon deleting duplicates and classifying the remaining exceptions and logs, generate a report that includes an indication of the number of logs or exceptions included in one or more categories. This report may be transmitted to or accessed by, for example, a person developing a product. Also, the exception and log analysis system 205 may provide an Application Programming Interface (API) to receive a request for an exception report or for actual exceptions that occurred at a particular time or within a particular time range, were generated by a particular service or at a particular machine, etc. The request may include the particular time or time range and the service name. In response to the request, the exception and log analysis system 205 may provide a list of exceptions for the particular service that occurred at the particular time or during the particular time range. The exceptions may be presented in a categorized form or along with a count of each exception type (e.g., a particular exception occurred one hundred times during the particular time).

In addition, other automated systems, such as the change evaluating system 203 and the ticketing system 211, or a variety of troubleshooting tools may be consumers of the classified exceptions and logs data stored in the records of the exceptions and logs database 109. For example, the change evaluating system 203 may communicate with the exception and log categorizing system 101 to access performance data that pertains to a service or machine and that is stored in the exceptions and logs database 109. The performance data (e.g., in form of exceptions or logs) may be used by the change evaluating system 203 during the evaluation of the performance of the service or machine after a change.

In some example embodiments, before categorizing the exceptions, the exception and log categorizing system 101, determines that a first exception is the same as (or substantially similar to) a second exception based on analyzing the first exception data (e.g., the first exception's stack trace) and the second exception data (e.g., the second exception's stack trace). The exception and log categorizing system 101 may compare the stack traces of the first exception and the second exception, and may identify data elements that are unique to the first exception or the second exception. An example of a unique (or dynamic) data element may be a user identification (user ID). Also, based on comparing the first exception's stack trace and the second exception's stack trace, the exception and log categorizing system 101 may identify data elements that are common to the first exception and the second exception.

The exception and log categorizing system 101 may remove (or strip) the unique elements from the first and second exceptions' stack terraces, and retain the common data elements of the first and second exceptions' stack traces. Further, the exception and log categorizing system 101 may calculate unique hash codes (e.g., Message-Digest algorithm 5 (MD5) hash codes) for the first exception and the second exception based on hashing (e.g., applying a cryptographic hash function) to the common data (the stripped stack traces) of the first exception and the second exception. Using the hash codes, the exception and log categorizing system 101 may classify the first exception and the second exception. If the hash code of the first exception coincides with the hash code of the second exception, the first exception and the second exception are categorized as being the same exception associated with the identical hash code. If the hash code of the first exception is not identical to the hash code of the second exception, the first exception and the second exception are assigned to different categories associated with the respective hash code of the first exception or second exception.

As illustrated in FIG. 2, with some example embodiments, the analysis engine 202 is implemented as a service that operates in conjunction with various automated systems, such as the change evaluating system 203, the garbage collection analyzing system 207, and the redline monitoring system 209. For instance, any number of automated systems may receive exception data, log data, or data (e.g., reports) about the categorization of exceptions or logs from the exception and log categorizing system 101. Such data may be used, for example, by the change evaluating system 203 during its evaluations of performances of services or machines after certain changes occurred.

With some embodiments, the analysis engine 202 may include or have an associated publicly available application programming interface (API) that enables third-party applications to invoke the functionality of the analysis engine 202. While the applications and services that utilize (or leverage) the analysis engine 202 are generally associated with the operator of the exception and log categorizing system 101, certain functionalities of the analysis engine 202 may be made available to third parties under special arrangements. In some example embodiments, third-party applications may invoke the functionality of the analysis engine 202 using a "software as a service" (SaaS) or a stand-alone (turnkey or on-premise) solution.

Also shown in FIG. 2 are the ticketing system 211, the mail server 212, and the alert system 213. Upon categorizing the exception into one or more categories, the exception and log categorizing system 101 may generate an exception report based on the categorizing of the exception. The exception report may include the exception, one or more categories to which the exception was assigned, one or more exception counts associated with an attribute of the exception, or any suitable combination thereof. The exception and log categorizing system 101 may transmit a communication including the exception report to the ticketing system 211, the mail server 212, the alert system 213, a device of a user (e.g., a developer), or any suitable combination thereof.

Upon receiving the communication including the exception report from the exception and log categorizing system 101, the ticketing system 211 may automatically analyze the exception report and create a ticket based on the contents of the exception report. The mail server 212, upon receiving the communication including the exception report from the exception and log categorizing system 101, may automatically generate an email message and transmit it to the device of the user. Similarly, upon receiving the communication including the exception report from the exception and log categorizing system 101, the alert system 213 may automatically generate and transmit an alert to the device of the user.

Any of the machines, databases, or devices shown in FIG. 2 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 2 may be combined into a single machine, and the functions described herein for any single machine, database, or device may be subdivided among multiple machines, databases, or devices.

The network 214 may be any network that enables communication between or among machines, databases, and devices (e.g., the exception and log categorizing system 101 and the ticketing system 211). Accordingly, the network 214 may be a wired network, a wireless network (e.g., a mobile or cellular network), or any suitable combination thereof. The network 214 may include one or more portions that constitute a private network, a public network (e.g., the Internet), or any suitable combination thereof.

Figure 3:
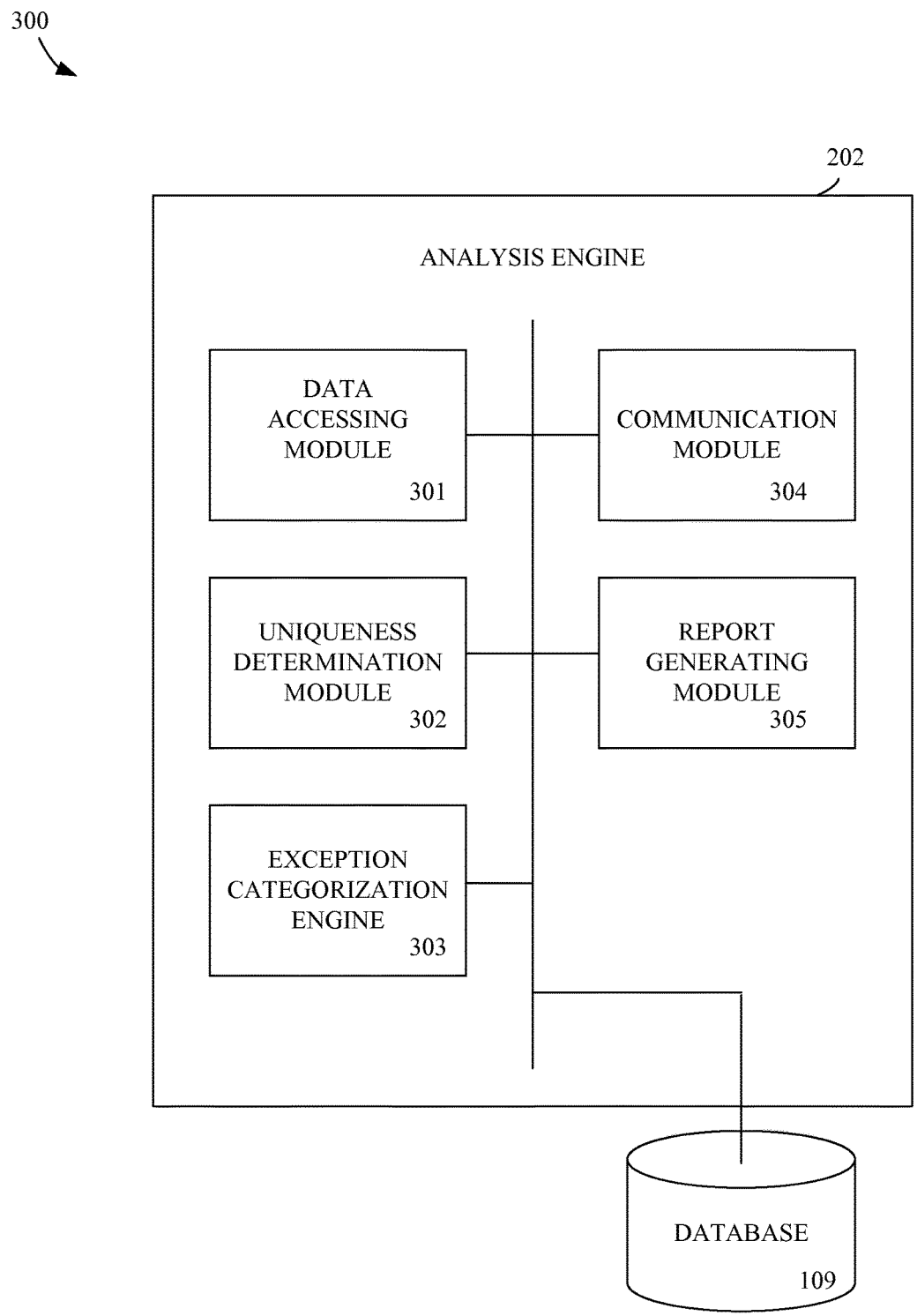
FIGS. 3-5 are block diagrams of certain modules of an example exception and log categorizing system, consistent with some example embodiments.

FIG. 3 is a block diagram of certain modules of an example exception and log categorizing system, consistent with some example embodiments. Some or all of the modules of system 300 illustrated in FIG. 3 may be part of the analysis engine 202. As such, system 300 is described by way of example with reference to FIG. 2.

The system 300 is shown to include a number of modules that may be in communication with each other. One or more modules of the system 300 may reside on a server, client, or other processing device. One or more modules of the system 300 may be implemented or executed using one or more hardware processors. In some example embodiments, one or more of the depicted modules are implemented on a server of the network-based system 100. In FIG. 3, the analysis engine 202 is shown as including a data accessing module 301, a uniqueness determination module 302, an exception categorization module 303, a communication module 304, and a report generating module 305 configured to communicate with each other (e.g., via a bus, shared memory, or a switch). Also shown in FIG. 3 is a database 109 configured to communicate with one or more modules of the analysis engine 202.

The data accessing module 301 in FIG. 3 is configured to access exception data of an exception that occurred on a machine. The exception data includes a stack trace of the exception. The exception data may also include an identifier of the machine where the exception occurred and a timestamp identifying a time when the exception occurred. The data accessing module 301 may pull exception data (or log data) from a machine at a predetermined time or may receive exception data (or log data) pushed by the machine.

Figure 4:
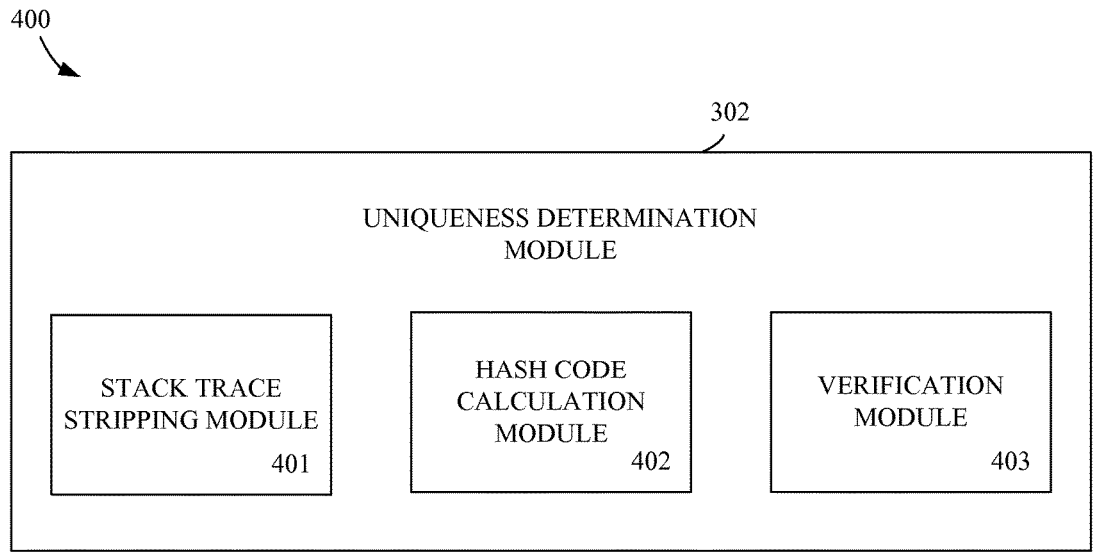

The uniqueness determination module 302 in FIG. 3 is configured to determine that the exception is unique based on the stack trace of the exception. In some example embodiments, as illustrated in FIG. 4, the uniqueness determination module 302 includes a number of modules that may be in communication with each other. In FIG. 4, the uniqueness determination module 302 is shown as including a stack trace stripping module 401, a hash code calculation module 402, and a verification module 403 configured to communicate with each other (e.g., via a bus, shared memory, or a switch).

The stack trace stripping module 401 in FIG. 4 is configured to remove dynamic data from the stack trace of the exception. The removal of the dynamic data from the stack trace of the exception results in a stripped stack trace of the exception. For example, line numbers, message, or dynamic java methods are removed from the stack trace of the exception. The remainder of the stack trace is the stripped stack trace of the exception. The hash code calculation module 402 in FIG. 4 is configured to access the stripped stack trace of the exception and to apply a hash (e.g., MD5) function to the stripped stack trace to calculate a particular primary hash code. A particular primary hash code may be a unique sequence of hexadecimal numbers that uniquely identifies (or corresponds to) a particular stripped stack trace of an exception. For example, the application of the same hash function to two stack traces that have at least one difference will result in different primary hash codes.

In some instances, the application of a hash function to the stripped stack traces of a plurality of exceptions may return (or result in) the same particular primary hash code. Resulting identical primary hash codes indicate identical stripped stack traces of the plurality of exceptions. In those instances, the plurality of exceptions are considered to be similar based on determining that they have identical stripped stack traces (and identical primary hash codes) and are categorized into a same exception category based on the particular primary hash code. In some example embodiments, exceptions with similar stack traces and/or identical stripped stack traces indicate to the same problem with a machine, software, or service. The categorizing or grouping together of the exceptions that have similar stack traces may allow the exception and log categorizing system 101 to automatically identify the exceptions that indicate to the same problem, analyze the exceptions based on various categorization criteria (e.g., stack trace, machine, type of exception, time of exception, etc.), count the number of exceptions based on different categorization criteria, establish the magnitude of the problem indicated by the exceptions, prioritize responses, etc.

The verification module 403 in FIG. 4 is configured to access one or more primary hash codes stored in a record of a database, to compare the particular primary hash code against the one or more primary hash codes, and to determine whether the particular primary hash code is included in the one or more primary hash codes. If the particular primary hash code is determined to not be included in the one or more primary hash codes (e.g., the particular primary hash code is not one of the one or more primary hash codes), then the particular primary hash code may be stored in a record of the exceptions and logs database 109. The primary hash code may be stored in association with an exception category identifier that identifies an exception category to which the exception is assigned and with the stripped stack trace to which the hash function was applied and resulted in the particular primary hash code. If the particular primary hash code is determined to be included in the one or more primary hash codes (e.g., the particular primary hash code is one of the one or more primary hash codes), then the particular primary hash code may not be stored in a record of the exceptions and logs database 109. As discussed above, storing a single copy of the particular primary hash code in association with the stripped stack trace of the exception from which the particular primary hash code resulted may allow the exceptions and logs database 109 to remain small and the queries into the exceptions and logs database 109 to be fast.

In certain example embodiments, the stack trace stripping module 401 in FIG. 4 is further configured to remove additional data from the stripped stack trace of the exception. The removal of the additional data from the stripped stack trace of the exception results in a twice-stripped stack trace of the exception. The hash code calculation module 402 in FIG. 4 is configured to access the twice-stripped stack trace of the exception and to apply a hash function to the stripped stack trace to calculate a particular secondary hash code. In some instances, the same hash function is used to calculate the particular secondary hash code as the one used to calculate the particular primary hash code associated with the exception.

By using different ways to strip the stripped stack trace of the exception, more than one particular secondary hash code may be calculated. As a result, a particular primary hash code (that uniquely corresponds to a stripped stack trace) may have a one-to-many relationship with a number of secondary hash codes derived from the stripped stack trace. The calculation of secondary hash codes may allow for more nuanced categorization of exceptions into one or more categories. The particular secondary hash code may be stored in association with the exception category identifier, with the stripped stack trace, and with the particular primary hash code in the record of the database.

Referring back to FIG. 3, the exception categorization module 303 in FIG. 3 is configured to categorize, by a machine including a memory and at least one processor, the exception into one or more exception categories based on the stack trace of the exception. The exception categorization module 303 may categorize the exception into one or more categories responsive to determining that the exception is unique. The exception categorization module 303 may also categorize the exception into one or more categories based on other categorization criteria, such as the machine were the exception occurred, the time when the exception occurred, the type of the exception, the service which generated the exception, etc.

According to certain example embodiments, if the particular primary hash code is determined to not be unique (e.g., is one of the one or more primary hash codes already stored in a record of the database), then the particular primary hash code is not stored in a record of the exceptions and logs database 109. One or more exception counts associated with the exception may each be incremented by one based on the stack trace of the exception or based on other categorization criteria. For example, as discussed in more detail below, the exception count associated with the particular primary hash code is increased by one based on the exception being associated with the particular primary hash code. In addition, the exception count associated with a particular secondary code may be increased based on the exception being associated with the particular secondary hash code. Similarly, the exception count associated with a particular machine where the exception occurred may be incremented by one based on the exception occurring on the particular machine and being associated with the particular primary hash code. Other exception counts may be incremented to account for the occurrence of the exception based on a variety of categorization criteria (e.g., an alternative secondary hash code associated with the exception, a timestamp of the exception, an exception type, a service that generated the exception, etc.) or a suitable combination thereof.

Figure 5:
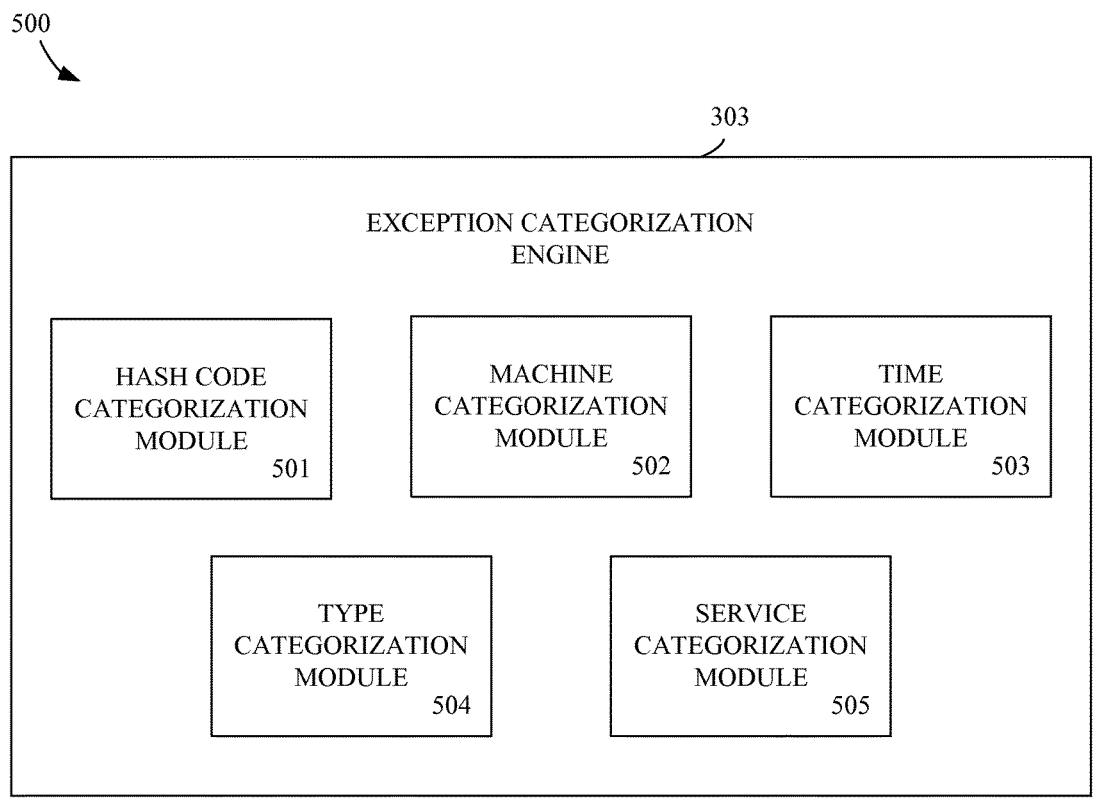

In some example embodiments, as illustrated in FIG. 5, the exception categorization module 303 includes a number of modules that may be in communication with each other. In FIG. 5, the exception categorization module 303 is shown as including a hash code categorization module 501, a machine categorization module 502, a time categorization module 503, a type categorization module 504, and a service categorization module 505 configured to communicate with each other (e.g., via a bus, shared memory, or a switch).

The hash code categorization module 501 in FIG. 5 is configured to identify an exception count associated with the particular primary hash code. For example, the hash code categorization module 501 identifies a first exception count associated with a first primary hash code and second exception count associated with a second primary hash code.

In some example embodiments, the identifying by the hash code categorization module 501 of the exception count associated with the particular primary hash code includes determining that the exception count associated with the particular primary hash code does not exist and generating the exception count associated with the particular primary hash code.

The hash code categorization module 501 in FIG. 5 is further configured to increase the exception count associated with the particular primary hash code by one based on the exception being associated with the particular primary hash code. The exception count associated with the particular primary hash code indicates a number of exceptions being associated with the particular primary hash code.

In certain example embodiments, the exception count associated with the particular primary hash code is stored in association with an exception category identifier, with the stripped stack trace, and with the particular primary hash code in the record of a database. The exception category identifier identifies an exception category corresponding to the particular primary hash code of the exception.

In some example embodiments, the hash code categorization module 501 in FIG. 5 is configured to identify an exception count associated with the particular secondary hash code. The identifying by the hash code categorization module 501 of the exception count associated with the particular secondary hash code, in certain example embodiments, includes determining that the exception count associated with the particular secondary hash code does not exist and generating the exception count associated with the particular secondary hash code.

The hash code categorization module 501 in FIG. 5 is further configured to increase the exception count associated with the particular secondary hash code by one based on the exception being associated with the particular secondary hash code. The exception count associated with the particular secondary hash code indicates a number of exceptions being associated with the particular secondary hash code.

The machine categorization module 502 in FIG. 5 is configured to categorize the exception based on an identifier of the machine where the exception occurred. In some example embodiments, the categorizing by the machine categorization module 502 of the exception based on the identifier of the machine includes determining the identifier of the machine based on the exception data of the exception, identifying an exception count associated with the machine based on the identifier of the machine and the stack trace of the exception (e.g., the particular primary hash code associated with the exception), and increasing the exception count associated with the machine by one based on the exception occurring on the machine. The exception count associated with the machine indicates the number of times the exception occurred on the machine.

In some example embodiments, the identifying by the machine categorization module 502 of the exception count associated with the machine includes determining that the exception count associated with the machine does not exist and generating the exception count associated with the machine. Upon generating the exception count associated with the machine, the machine categorization module 502 may increase the exception count associated with the machine by one.

The time categorization module 503 in FIG. 5 is configured to categorize the exception based on a timestamp that identifies when the exception occurred. In some example embodiments, the categorizing by the time categorization module 503 of the exception based on the timestamp includes determining the timestamp based on the exception data of the exception, identifying an exception count associated with the timestamp, and increasing the exception count associated with the timestamp by one based on the exception occurring at the timestamp. The exception count associated with the timestamp indicates the number of times the exception occurred at the timestamp (e.g., at the particular time).

In some example embodiments, the identifying by the time categorization module 503 of the exception count associated with the timestamp includes determining that the exception count associated with the timestamp does not exist and generating the exception count associated with the timestamp. Upon generating the exception count associated with the timestamp, the time categorization module 503 may increase the exception count associated with the timestamp by one.

The type categorization module 504 in FIG. 5 is configured to categorize the exception based on an exception type that identifies a type of the exception. In some example embodiments, the categorizing the exception based on the exception type includes determining the exception type based on the exception data of the exception, identifying an exception count associated with the exception type, and increasing the exception count associated with the exception type by one based on the exception being of the exception type. The exception count associated with the exception type indicates a number of times exceptions of the exception type occurred.

In some example embodiments, the identifying by the type categorization module 504 of the exception count associated with the exception type includes determining that the exception count associated with the exception type does not exist and generating the exception count associated with the exception type. Upon generating the exception count associated with the exception type, the time categorization module 503 may increase the exception count associated with the exception type by one.

The service categorization module 505 in FIG. 5 is configured to categorize the exception based on an identifier of a service that generated the exception. A particular service may generate the exception during its execution. In some example embodiments, the categorizing by the service categorization module 505 of the exception based on the identifier of the service includes determining the identifier of the service based on the exception data of the exception, identifying an exception count associated with the service based on the identifier of the service and the stack trace of the exception, and increasing the exception count associated with the service by one based on the exception being generated by the service. The exception count associated with the service indicating the number of times the exception was generated by the service.

In some example embodiments, the identifying by the service categorization module 505 of the exception count associated with the service includes determining that the exception count associated with the service does not exist and generating the exception count associated with the service. Upon generating the exception count associated with the service, the service categorization module 505 may increase the exception count associated with the service by one. Other exception counts may be incremented to account for the occurrence of the exception based on a variety of categorization criteria or a suitable combination thereof.

Referring back to FIG. 3, the communication module 304 in FIG. 3 is configured to receive a request for an exception report. The request for an exception report may be received from a device of a user. The exception report may be made by the user via the device of the user. The report generating module 305 in FIG. 3 is configured to generate, in response to the request, the exception report. The exception report may include the categorization of the exception. The communication module 304 may then transmit a communication to the device of the user. The communication may include the exception report requested by the user.

In some example embodiments, the request for the exception report includes a categorization criterion. Based on the categorization criteria included in the request for the exception report, the exception categorization engine 303 may perform the categorizing of the exception at least in part based on the categorization criterion included in the request. For example, a report request may be received from a user via a user's device. The request may specify two categorization criteria: a machine and a timestamp. In response to the request, the exception categorization engine 303 may categorize the exceptions that occurred on the machine (specified in the report request) at the time specified in the report request. Based on the categorizing of the exceptions by the exception categorization engine 303, the report generating module 305 may generate an exception report that includes information about the categorization of the exceptions that occurred on the specific machine at the particular time.

According to a further example, the request for the exception report specifies a time range. In response to the request, the exception categorization engine 303 may categorize the exceptions that occurred on one or more of monitored machines at least in part based on the time range specified in the request.

The report generating module 305 may generate, automatically or in response to a report request, a report that includes a raw count of the number of exceptions that occurred between two timestamps on a particular machine (e.g., the number of exceptions, grouped by primary hash code, that occurred between a first time and a second time on a particular machine). The report generating module 305 may also generate, automatically or in response to a report request, a report that includes a count of exceptions based on a series of timestamps at a particular machine (e.g., "At 11:01, two exceptions associated with a first primary hash code occurred on machine 1; at 11:02, five exceptions associated with a second primary hash code occurred on machine 1; etc.") The report generating module 305 may also generate, automatically or in response to a report request, a report that includes a count of exceptions that occurred on a particular machine based on a specific hash code, exception type, service, etc.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 6:
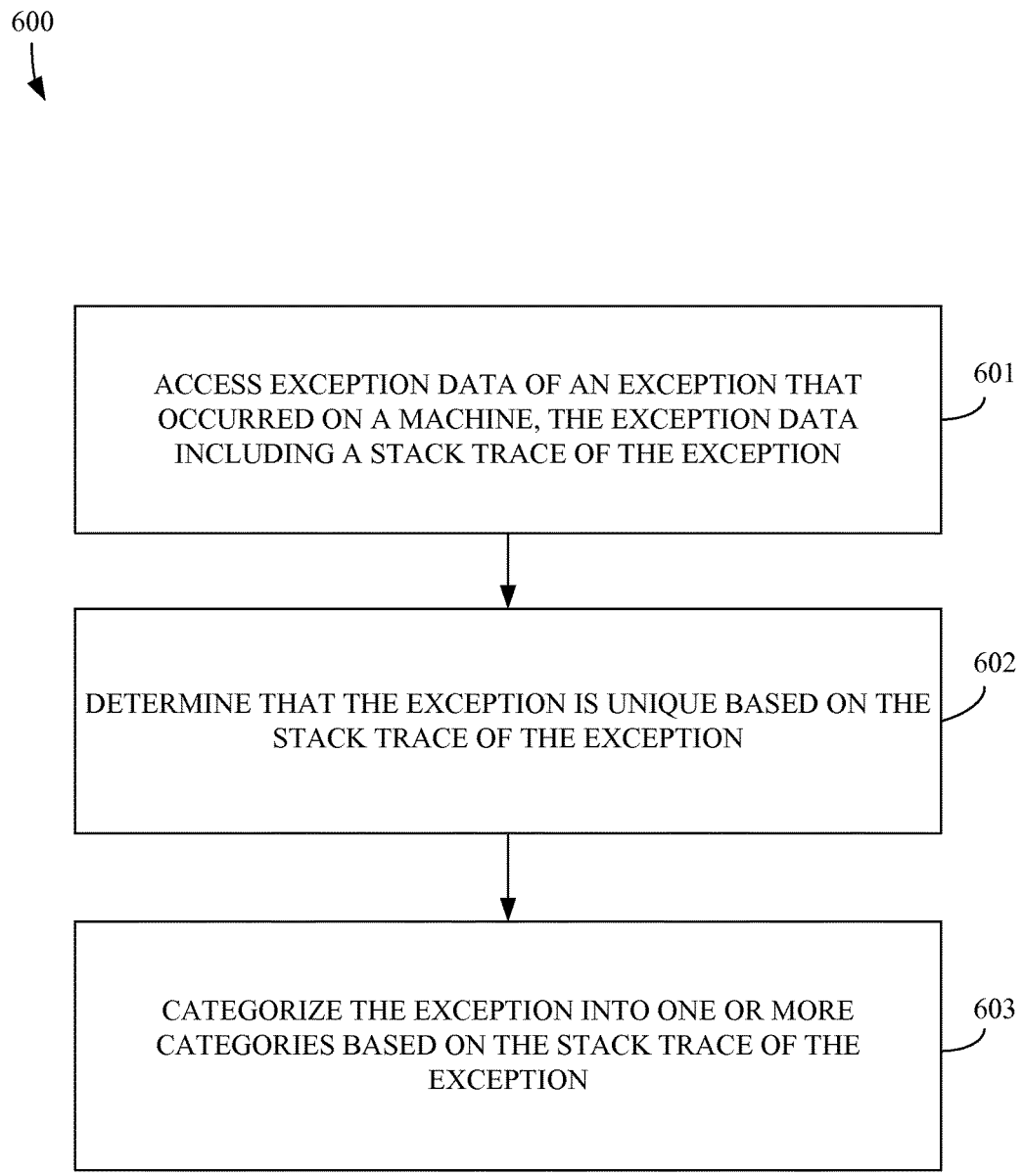
FIG. 6 is a flowchart diagram illustrating method steps of an example method for categorizing an exception, consistent with some example embodiments.

FIG. 6 is a flowchart diagram illustrating method steps of an example method 600 for categorizing an exception, consistent with some example embodiments. The inventive subject matter may be implemented for use with applications that utilize any of a variety of network or computing models, to include web-based applications, client-server applications, or even peer-to-peer applications.

Consistent with some example embodiments, the method begins at method operation 601, when the data accessing module 301 accesses exception data (e.g., log event 102, log event 103, or log event 104) of an exception that occurred on a machine. The exception data includes a stack trace of the exception. The exception data may also include an identifier of the machine where the exception occurred and a timestamp that identifies a time when the exception occurred.

At method operation 602, the uniqueness determination module 302 determines, using at least one computer processor, that the exception is unique based on the stack trace of the exception. In certain example embodiments, to determine that the exception is unique, the uniqueness determination module 302 removes dynamic data from the stack trace of the exception to result in a stripped stack trace of the exception; applies a hash function to the stripped stack trace to calculate a particular primary hash code; accesses one or more primary hash codes stored in a record of a database; compares the particular primary hash code against the one or more primary hash codes; and determines that the particular primary hash code is not included in (e.g., is not one of) the one or more primary hash codes. The particular primary hash code determined to be unique (e.g., no previously stored in the record of the database) may be stored in the record of the database 109.

Next, at method operation 603, the exception categorization engine 303, categorizes the exception into one or more categories based on the stack trace of the exception (e.g., the primary hash code associated with the exception or one or more secondary hash codes associated with the exception). In some example embodiments, categorizing the exception into one or more categories includes assigning the exception to (or classifying the exception into) one or more categories. In certain example embodiments, categorizing exceptions into a category includes identifying a plurality of exceptions with similar stack traces (e.g., exceptions that have different primary hash codes but identical secondary hash codes) and assigning the plurality of exceptions to a category identified by the secondary hash code shared by the plurality of exceptions. In various example embodiments, the categorizing of exceptions is performed in response to receiving a request for an exception report (e.g., from a device of a user or from any automated systems that consume exception data). In some example embodiments, the categorizing of exceptions is performed near real time upon accessing exception data of the exceptions and before receiving a request for an exception report.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figures 7, 8:
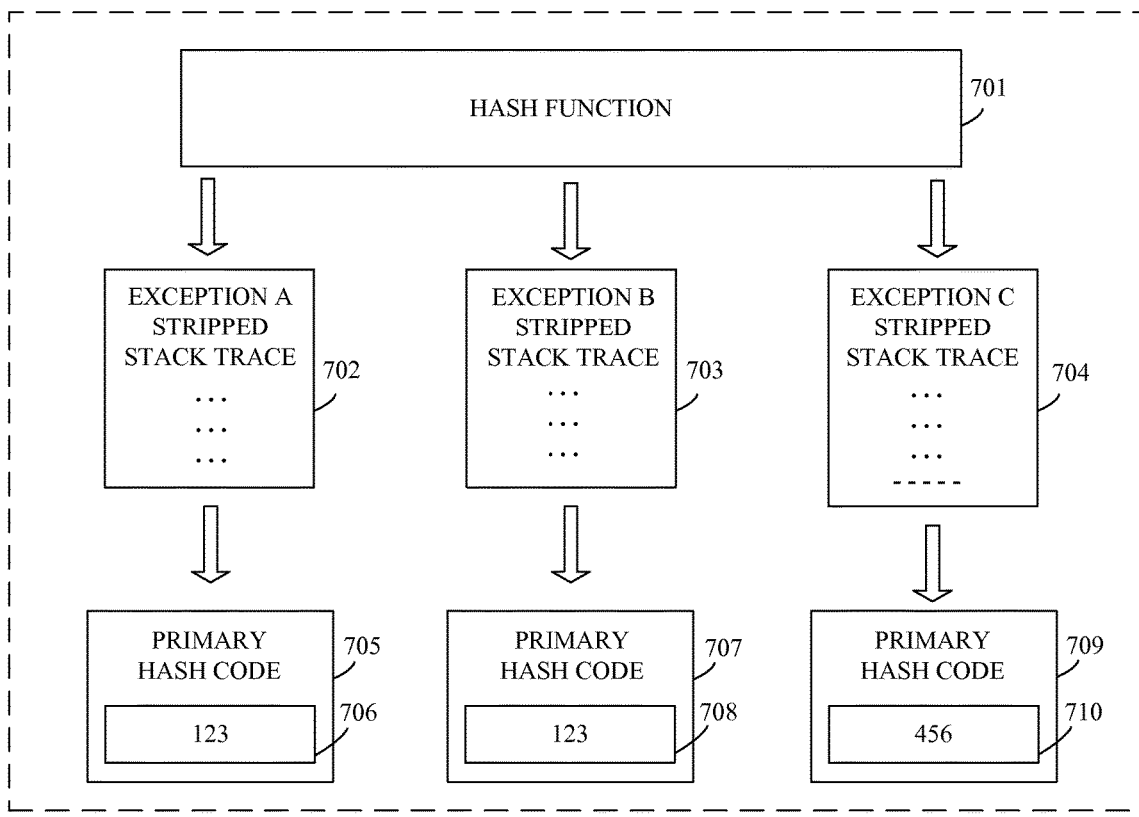
FIG. 7 is a functional representation of an example exception and log categorizing system, according to various example embodiments.
FIG. 8 is a table diagram illustrating an example categorization of exceptions.

FIG. 7 is a functional representation of an example exception and log categorizing system 101, according to various example embodiments. In some example embodiments, to identify similar exceptions (that may point to the same problem with a machine or service), the exception and log system 101, for each accessed log event (exception data of an exception), removes any obvious dynamic data in the stack trace included in the log event. The removal of dynamic data from a full stack trace of an exception results in a stripped stack trace. For example, as illustrated in FIG. 7, the removal of the dynamic data from exception A, exception B, and exception C results in the stripped stack trace 702, the stripped stack trace 703, and the stripped stack trace 704, respectively.

Then, as shown in FIG. 7, the exception and log categorizing system 101 applies a hash function 701 to the stripped stack trace 702, the stripped stack trace 703, and the stripped stack trace 704, respectively. The application of the hash function 701 to the stripped stack trace 702, the stripped stack trace 703, and the stripped stack trace 704, respectively, returns (or results in) a particular primary hash code (e.g., primary hash code 705, primary hash code 707, and primary hash code 709) associated with the stripped stack trace 702, the stripped stack trace 703, and the stripped stack trace 704, respectively. Each of the resulting primary hash codes has a value 706, 708, or 710, respectively. For example, the primary hash code 705 has the value "123"; the primary hash code 707 has the value "123"; and the primary hash code 709 has the value "456".

In some instances, the application of the same hash function 701 to the stripped stack traces of different exceptions may result in identical primary hash code values. For example, the value 706 (e.g., "123") of the primary hash code 705 is identical to the value 708 (e.g., "123") of the primary hash code 707. This may occur when the stripped stack traces of the respective exceptions are identical. For example, as shown in FIG. 7, the exception A stripped stack trace 702 (e.g., " . . . . . . . . . ") is identical to the exception B stripped stack trace 703 (" . . . . . . . . . ".)

In some instances, the application of the same hash function 701 to the stripped stack traces of different exceptions may result in different primary hash code values. For example, the value 708 (e.g., "123") of the primary hash code 707 is different from the value 710 (e.g., "456") of the primary hash code 709. This may occur when the stripped stack traces of the respective exceptions are different (e.g., not identical to each other.) For example, as shown in FIG. 7, the exception B stripped stack trace 703 (e.g., " . . . . . . . . . ") is different from the exception C of the stripped stack trace 70 (" . . . . . . . . . . . . . . . . ".)

Because a primary hash code corresponds to (and uniquely identifies) a particular stripped stack trace, there is a one-to-one relationship between a particular stack trace and a particular primary hash code. The one-to-one relationship between the particular primary hash code and the particular stack trace may allow for the grouping and counting of a plurality of exceptions that have identical stripped stack traces and that, therefore, indicate the same problem with a machine or service.

In some instances, two (or more) exceptions that have identical stripped stack traces (and identical primary hash code values) may have different full stack traces. By removing stack trace data that is unique to each of the two exceptions and calculating the primary hash codes associated with each of the two exceptions, the exception and log system 101 may determine that the two exceptions are similar and indicate the same problem. Then the two similar exceptions may be categorized into a category based on their identical primary hash code. Because the exception and log system 101 may store a single copy of the primary hash code that identifies a plurality of the same or similar exceptions, the value of the primary hash code shared by the two exceptions is stored once in a record of the database. Additionally, the exception count associated with the particular primary hash code is incremented to account for the occurrence of the two similar exceptions. The exception count is discussed in more detail below with respect to FIG. 11.

FIG. 8 is an example table diagram 800 illustrating a record of the exceptions and logs database 109 that includes a plurality of primary hash codes 803 each stored in association with a particular stripped stack trace 802 which served as basis for the calculation of the particular primary hash code 803, consistent with some example embodiments. Each of the stripped stack traces 802 and the associated particular primary hash code 803 is also associated with an exception category identifier (ID) 801 that identifies an exception category that corresponds to the particular primary hash code 803. As shown in FIG. 8, the stripped stack trace 802 (" . . . . . . . . . ") has a one-to-one relationship with the primary hash code "123", as well as with the exception category 1. Also, as shown in FIG. 8, the stripped stack trace 802 (" . . . . . . . . . . . . . . . . ") has a one-to-one relationship with the primary hash code "456", as well as with the exception category 2. The example table 800 may have more or less fields (e.g., columns or rows) than the ones illustrated in the example table 800 and discussed above.

Figures 9, 10:
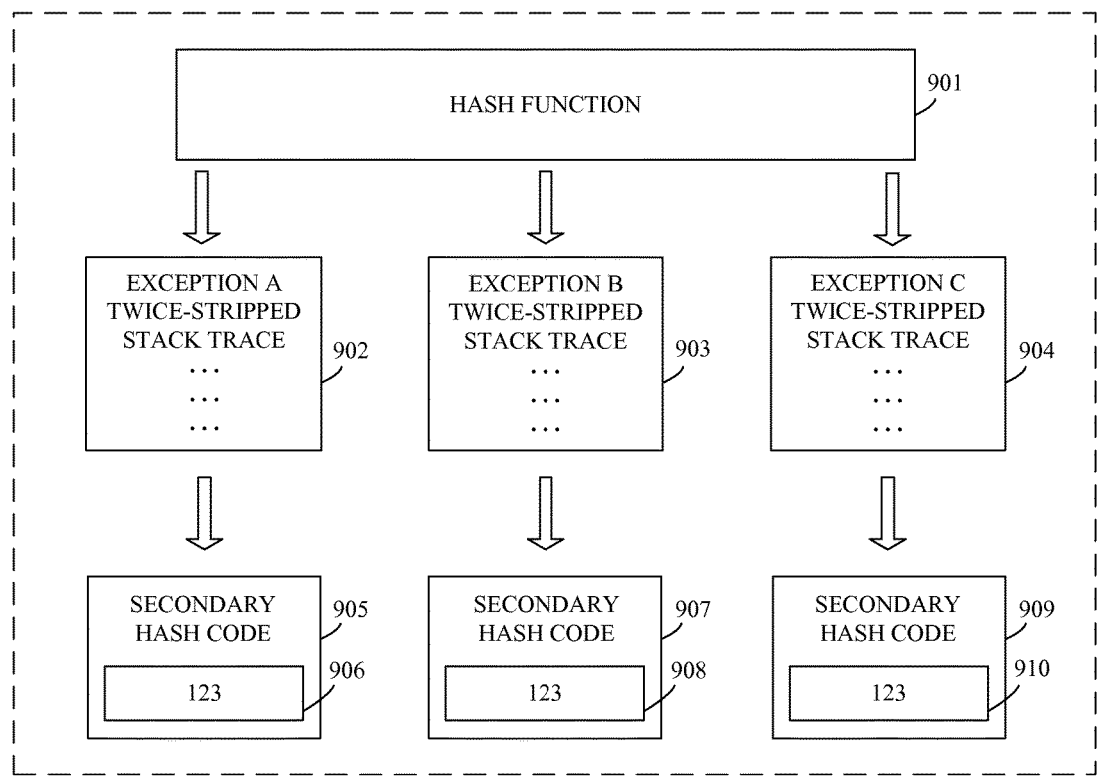

FIG. 9 is a functional representation of an example exception and log categorizing system 101, according to various example embodiments. In some example embodiments, to perform further categorization of exceptions, the exception and log system 101, calculates one or more secondary hash codes for each exception. To calculate a secondary hash code associated with an exception, the exception and log system 101, removes additional data (e.g., a particular line) from the stripped stack trace of the exception. In some instances, the additional data may be irrelevant to the calculation of a hash code or to the determination of the problem identified by the exception.

The removal of the additional data from the stripped stack trace of the exception results in a twice-stripped stack trace. For example, as illustrated in FIG. 9, the removal of the additional data (e.g., the line " - - - - - ") from the stripped stack trace of the exception C results in the twice-stripped stack trace 904. In some instances, if the stripped stack trace of an exception does not include any of the additional data, the stripped stack trace of the exception is treated as the twice-stripped stack trace of the exception for purposes of calculating the secondary hash code of the exception. For example, as illustrated in FIGS. 7 and 9, the exception A stripped stack trace 702 does not include the additional data (e.g., line " - - - - - ".) As a result, the exception and log system 101 treats the exception A stripped stack trace as the exception A twice-stripped stack trace 902 for purposes of calculating a secondary hash code associated with the exception A. Similarly, as illustrated in FIGS. 7 and 9, the exception B stripped stack trace 703 does not include the additional data (e.g., line " - - - - - ".) As a result, the exception and log system 101 treats the exception B stripped stack trace as the exception B twice-stripped stack trace 903 for purposes of calculating a secondary hash code associated with the exception B.

Upon generating the twice-stripped stack trace 902, the twice-stripped stack trace 903, and the twice-stripped stack trace 904, the exception and log categorizing system 101 applies the hash function 901 to the twice-stripped stack trace 902, the twice-stripped stack trace 903, and the twice-stripped stack trace 904, respectively, as shown in FIG. 9. The application of the hash function 901 to the twice-stripped stack trace 902, the twice-stripped stack trace 903, and the twice-stripped stack trace 904, respectively (or results in) a particular secondary hash code (e.g., secondary hash code 905, secondary hash code 907, and secondary hash code 909) associated with the twice-stripped stack trace 902, the twice-stripped stack trace 903, and the twice-stripped stack trace 904, respectively. Each of the resulting secondary hash codes has a value 906, 908, or 910, respectively. For example, the secondary hash code 905 has the value "123"; the secondary hash code 907 has the value "123"; and the secondary hash code 909 has the value "123".

In some instances, the application of the same hash function 901 to the twice-stripped stack traces of different exceptions may result in identical secondary hash code values. For example, the value 906 (e.g., "123") of the secondary hash code 905 is identical to the value 908 (e.g., "123") of the secondary hash code 907 and to the value 910 (e.g., "123") of the secondary hash code 909. This may occur when the twice-stripped stack traces of the respective exceptions are identical. For example, as shown in FIG. 9, the exception A twice-stripped stack trace 902 (e.g., " . . . . . . . . . ") is identical to the exception B twice-stripped stack trace 903 (" . . . . . . . . . ") and to the exception C twice-stripped stack trace 904 (e.g., " . . . . . . . . . "). In some instances, the application of the same hash function 901 to the twice-stripped stack traces of different exceptions may result in different secondary hash code values.

Furthermore, by removing different additional data from a stripped stack trace of a particular exception, the exception and log system 101 may generate additional secondary hash codes associated with the particular exception. As a result, the particular exception may be associated with one or more secondary hash codes. Also, because different subsets of the stripped stack trace data of the exception may be used in calculating a plurality of secondary hash codes associated with the exception, a one-to-many relationship may exist between the primary hash code associated with the exception and the plurality of secondary hash codes associated with the exception.

FIG. 10 is an example table diagram 1000 illustrating a record of the exceptions and logs database 109 that includes a plurality of secondary hash codes 1004 each stored in association with a particular primary hash code 1003 and with a particular stripped stack trace 1002 which served as basis for the calculation of the particular primary hash code 1003, consistent with some example embodiments. Each of the stripped stack traces 1002, the associated particular primary hash code 1003, and the associated particular secondary hash code 1004 is also associated with an exception category identifier (ID) 1001 that identifies an exception category that corresponds to the particular primary hash code 1003 and the particular secondary hash code 1004.

As shown in FIG. 10, the stripped stack trace 1002 " . . . . . . . . . " has a one-to-one relationship with the primary hash code "123", as well as with the exception category 1. In some instances, the stripped stack trace 1002 that corresponds to the exception category 1 has a one-to-many relationship with a plurality of secondary hash codes, including the secondary hash code "123", as discussed above with respect to FIG. 9.

Also, as shown in FIG. 10, the stripped stack trace 1002 (" . . . . . . . . . - - - - - ") has a one-to-one relationship with the primary hash code "456", as well as with the exception category 2. In some instances, the stripped stack trace 1002 that corresponds to the exception category 2 has a one-to-many relationship with a plurality of secondary hash codes, including the secondary hash code "123", as discussed above with respect to FIG. 9. The example table 1000 may have more or less fields (e.g., columns or rows) than the ones illustrated in the example table 1000 and discussed above.

FIG. 11 is an example table diagram 1100 illustrating a record of the exceptions and logs database 109, consistent with some example embodiments. Some or all of the fields of the table 1100 illustrated in FIG. 11 may be part of the table 1000. As such, table 1100 is described by way of example with reference to FIGS. 7, 9, and 10.

The example table 1100 is shown to include, for a number of exception categories 1101 (e.g., the exception category 1 and the exception category 2) corresponding to particular primary hash codes (e.g., the primary hash code "123" and the primary hash code "456"), an exception count 1102 associated with the particular primary hash code, a timestamp 1103 that identifies when the exception(s) occurred, and a machine identifier (ID) 1104 that identifies where the exception(s) occurred. For example, upon calculating the primary hash code 705 associated with the exception A and the primary hash code 707 associated with the exception B, the exception and log system 101 determines that the value of the primary hash code 707 and the value of the primary hash code 707 are identical: "123". The exception and log system 101 determines, based on the exception data of the exception A and the exception data of the exception B, that the exceptions A and B occurred at 11:01 on the machine 1. If the primary hash code with the value "123" does not exist in a record of the database 109, the exception and log system 101 stores one copy of the primary hash code "123" in the exception category 1 in the table 800 of FIG. 8. If the primary hash code with the value "123" exists in a record of the database 109, the exception and log system 101 does not store another copy of the primary hash code "123" in exception category 1 in the table 800.

Next, the exception and log system 101 identifies an exception count 1102 (in the table 1100 of FIG. 11) associated with the primary hash code "123" based on the exception category 1, the time 1103 when the exceptions occurred (e.g., 11:01), and the machine ID 1104 where the exceptions occurred (e.g., machine 1). The exception and log system 101 increases the exception count 1102 associated with the primary hash code "123" by two to account for the exception A and exception B being associated with the primary hash code "123" and occurring at 11:01 on machine 1.

Similarly, upon calculating the primary hash code 709 associated with the exception C, the exception and log system 101 determines that the value of the primary hash code 709 is "456". The exception and log system 101 determines, based on the exception data of the exception C, that the exception C occurred at 11:01 on the machine 3. If the primary hash code with the value "456" does not exist in a record of the database 109, the exception and log system 101 stores one copy of the primary hash code "456" in the exception category 2 in the table 800 of FIG. 8. If the primary hash code with the value "456" exists in a record of the database 109, the exception and log system 101 does not store another copy of the primary hash code "456" in exception category 2 in the table 800.

Next, the exception and log system 101 identifies an exception count 1102 (in the table 1100 of FIG. 11) associated with the primary hash code "456" based on the exception category 2, the time 1103 when the exceptions occurred (e.g., 11:01), and the machine ID 1104 where the exceptions occurred (e.g., machine 3). The exception and log system 101 increases the exception count 1102 associated with the primary hash code "456" by one to account for the exception C being associated with the primary hash code "456" and occurring at 11:01 on machine 3.

Similarly, upon calculating the primary hash codes associated with a plurality of exceptions, the exception and log system 101 determines that the primary hash codes associated with three of the plurality of the exceptions have the value "123". The exception and log system 101 determines, based on the exception data of the three exceptions, that the three exceptions occurred at 11:05 on the machine 2. The exception and log system 101 further determines that the primary hash code with the value "123" exists in a record of the database 109, and does not store another copy of the primary hash code "123" in exception category 1 in the table 800.

Next, the exception and log system 101 identifies an exception count 1102 (in the table 1100 of FIG. 11) associated with the primary hash code "123" based on the exception category 1, the time 1103 when the exceptions occurred (e.g., 11:05), and the machine ID 1104 where the exceptions occurred (e.g., machine 3). The exception and log system 101 increases the exception count 1102 associated with the primary hash code "123", the time 11:05, and the machine 2 by three to account for the three exceptions associated with the primary hash code "123" and occurring at 11:05 on machine 2.

As shown in the table 1100 of FIG. 11, the exception count 1102 associated with the primary hash code "123" (identified by the exception category 1) indicates that two exceptions associated with the primary hash code "123" occurred at 11:01 on the machine 1 and three exceptions associated with the primary hash code "123" occurred at 11:05 on the machine 2. Several categorizations of these exceptions may be possible. The exceptions may be categorized based on the primary hash code "123" with which the exceptions are associated (e.g., the five exceptions are grouped as similar based on being associated with the same primary hash code "123"). The exceptions may also be categorized based on the time they occurred (e.g. two exceptions associated with the primary hash code "123" occurred at 11:01 and three exceptions associated with the primary hash code "123" occurred at 11:05). The exceptions may also be categorized based on the machine where they occurred (e.g., two exceptions associated with the primary hash code "123" occurred on the machine 1 and three exceptions associated with the primary hash code "123" occurred on the machine 3). Also, the exceptions may be categorized based on a variety of other categorization criteria, such as one or more secondary hash codes of the exceptions, a service, an exception type, etc. The example table 1100 may have more or less fields (e.g., columns or rows) than the ones illustrated in the example table 1100 and discussed above.

FIG. 12 is an example table diagram 1200 illustrating a record of the exceptions and logs database 109, consistent with some example embodiments. Some or all of the fields of the table 1200 illustrated in FIG. 12 may be part of the table 1100. As such, table 1200 is described by way of example with reference to FIGS. 7, 10, and 11.

The example table 1200 is shown to include, for a number of machine identifiers 1201, a machine name 1202 associated with a corresponding machine identifier 1201, and a service identifier (ID) 1203 that identifies a particular service whose running generated the exception(s). For example, as shown in the table 1200 of FIG. 12, machine 1 is also known as machine alpha. Upon increasing the exception count 1102 associated with the exception category 1 to account for the exception A and the exception B occurring at 11:01 on the machine 1, the exception and log system 101 may record in the table 1200 the particular service ID 1203 (e.g., service X) that was running when the exceptions A and B were generated.

Similarly, upon increasing the exception count 1102 associated with the exception category 2 to account for the exception C occurring at 11:01 on the machine 3, the exception and log system 101 may record in the table 1200 the particular service ID 1203 (e.g., service X) that was running when the exception C was generated. Similarly, upon increasing the exception count 1102 associated with the exception category 1 to account for three exceptions occurring at 11:05 on the machine 2, the exception and log system 101 may record in the table 1200 the particular service ID 1203 (e.g., service X) that was running when the respective three exceptions were generated. The example table 1200 may have more or less fields (e.g., columns or rows) than the ones illustrated in the example table 1200 and discussed above.

As illustrated in the example database records illustrated in FIGS. 8, 10-12, the exception and log system 101 may categorize exceptions based on a variety of categorization criteria, such as a primary hash code, one or more secondary hash codes, a time, a machine, a service, an exception type, etc. Such categorization of data may allow for an efficient management, reporting, and retrieval of exception and exception category information.

Change Evaluating System

Referring back to FIG. 2, the change evaluating system 203 is a tool for evaluating a change pertaining to a service or machine. The change evaluating system 203 may, in some example embodiments, include a server which may be communicatively coupled to other machines, servers, or devices of the network-based system 100. The server may include an evaluation engine 204, which may include one or more modules for evaluating a change that pertains to a service or machine. In some example embodiments, the server may be communicatively coupled to a characteristics database 205 and to a rules database 206. The characteristics database 205 and the rules database 206 may reside on one or more physical or virtual machines.

The change evaluating system 203 in FIG. 2 may access (or receive) from the exception and log categorizing system 101, the garbage collection analyzing system 207, and the redline monitoring system 209 performance-related data that pertains to the performance of a service or machine. The data that pertains to the performance of a service or machine may, for example, be stored in one or more records of the exceptions and logs database 109, the Garbage Collection (GC) metrics database 208, or the capacity metrics database 210 that may or may not be part of the exception and log categorizing system 101, the garbage collection analyzing system 207, or the redline monitoring system 209, respectively. Using the performance-related data that pertains to a service or machine, the change evaluating system 203 may determine how the service or machine performs after the change that pertains to the service or machine has been implemented (or has occurred).

As illustrated in FIG. 2, with some example embodiments, the evaluation engine 204 is implemented as a service that operates in conjunction with various automated systems, such as the exception and log categorizing system 101, the garbage collection analyzing system 207, and the redline monitoring system 209. For instance, any number of automated systems may invoke the functionality of the evaluation engine 204 to receive evaluations of performances of services or machines after certain changes occurred. However, with various alternative embodiments, the evaluation engine 204 may be implemented as its own application server module such that it operates as a stand-alone application.

With some embodiments, the evaluation engine 204 may include or have an associated publicly available application programming interface (API) that enables third-party applications to invoke the functionality of the evaluation engine 204. While the applications and services that utilize (or leverage) the evaluation engine 204 are generally associated with the operator of the change evaluating system 203, certain functionalities of the evaluation engine 204 may be made available to third parties under special arrangements. In some example embodiments, third-party applications may invoke the functionality of the evaluation engine 204 using a "software as a service" (SaaS) or a stand-alone (turnkey or on-premise) solution.

An indication of a change may be received at the change evaluating system 203 using any of the methods known to those of ordinary skill in the art. In some example embodiments, certain events (or changes) may be identified as relevant and may be logged upon their occurrence into an event log (e.g., stored in the exceptions and logs database 109) by an event logging component. The change evaluating system 203 may pull events from the event log at, for example, a pre-determined time (e.g., near real-time as the events are logged) or as a pre-determined number of events accumulate. Alternatively, the event log may push events to the change evaluating system 203 at a pre-determined time (e.g., near real-time as the events are logged) or upon accumulating a certain number of events. In various example embodiments, the change evaluating system 203 continuously monitors the machine or service for an occurrence of a change that pertains to the machine or service.

In certain example embodiments, the publish/subscribe paradigm is used to transmit notifications about changes. The publish/subscribe paradigm is a messaging pattern according to which senders of messages, called publishers, do not program the messages to be sent directly to specific receivers, called subscribers. Instead, published messages are characterized into classes, without knowledge of the identities of any subscribers. Similarly, subscribers may express interest in one or more classes, and may only receive messages that are of interest, without knowledge of what, if any, publishers exist.

To evaluate the performance of the service or machine in relation to the change, the change evaluating system 203, using a particular rule 204, may access and compare data that pertains to the performance of the service or machine before the change occurred with data that pertains to the performance of the service or machine after the change occurred. The performance data may be in the form of logs or exceptions recorded, for example, during the execution of a piece of software code, the running of a service, or the occurrence of hardware- or configuration-related events. An exception is an anomalous or exceptional event that requires special processing. Depending on the type of change (e.g., change to software, hardware, or service), the change evaluating system 203 may evaluate the performance of the service or machine based on different types of performance data, different rules, or both. For example, if the change was to the hardware of a particular machine, the change evaluating system 203 may access data from the system log file of the particular machine to receive relevant log data to be used in the evaluation of the quality of the performance of the service or machine after the change.

In addition, the change evaluating system 203 may evaluate different characteristics 203 of the performance of a service or machine. A performance characteristic 203 of a service or machine is an aspect or parameter of the performance of a service or machine that indicates how well the service or machine functions in a performance area. Examples of performance characteristics are latency, Queries Per Second (QPS), heap size growth rate, error rate, exceptions, busy Central Processing Unit (CPU) percentage, memory usage percentage (e.g., real, free, swap, avail etc.), wait CPU percentage, etc. Based on the type of change, a particular performance characteristic (also "characteristic") 203, or both, the change evaluating system 203 may determine the type of performance data required for evaluating the performance of the service or machine and may access data sources that have the relevant performance data for the service or machine. Examples of such data sources are the exceptions and logs database 109, the GC metrics database 208, and the capacity metrics database 210.

In some example embodiments, the change evaluating system 203 accesses data that pertains to a baseline instance of the service and data pertaining to a change instance of the service. The baseline instance of the service may be an instance of the service before the change occurred. The change instance of the service may be an instance of the service after the change occurred. Data that pertains to one or more instances of the service may be recorded in one or more records of a database accessible by the change evaluating system 203. The change evaluating system 203 may access the data that pertains to a baseline instance of the service and data pertaining to the change instance of the service upon receiving the indication of the change that pertains to the service or machine.

Further, the change evaluating system 203 identifies a specific performance characteristic 203 from a plurality of performance characteristics 203 of the service. The specific performance characteristic 203 may have a first value in the baseline instance of the service and a second value in the change instance of the service. In addition, the change evaluating system 203 accesses a plurality of rules 206 that may be used to evaluate the quality of the performance of the service or machine after the change. Each of the plurality of rules 206 corresponds to one of the plurality of performance characteristics 205 of the service. In some instances, several rules 206 correspond to a particular performance characteristic 205.

Further, the change evaluating system 203 selects a particular rule 206 from the plurality of rules 206 based on the particular rule 206 corresponding to the specific performance characteristic 205. Based on the first value of the performance characteristic 205, the second value of the performance characteristic 205 and the selected particular rule 206, the change evaluating system 203 evaluates the performance of the service or machine after the change.

In some example embodiments, the evaluating by the change evaluating system 203 of the performance of the service after the change includes comparing the first value and the second value of the performance characteristic 205, determining that a difference exists between the first value and the second value of the performance characteristic 205 based on the comparing of the first value and the second value of the performance characteristic 205, and analyzing the difference between the first value and the second value of the performance characteristic 205 according to the selected particular rule 206.

In certain example embodiments, when evaluating the performance of the service after the change, the change evaluating system 203 identifies the particular rule 206 to be applied to the data that pertains to the performance of the service or machine after the change. The change evaluating system 203 also identifies a condition specified in the particular rule 206. Then, the change evaluating system 203 applies the particular rule 206 to the data and determines that the condition specified in the particular rule 206 is satisfied by the data. In some instances, the particular rule 206 indicates a maximum threshold value that a performance characteristic 205 may have. For example, the particular rule 206 may indicate a maximum threshold latency rate of a service. While evaluating the performance of the service or machine after the change, the change evaluating system 203 may determine, based on the data, that a latency rate of the service or machine determined after the change exceeds the maximum threshold latency rate.

Garbage Collection Analyzing System

The garbage collection analyzing system 207 is a tool for automated monitoring and analysis at scale of garbage collection events related to services running within the environments of a company. Garbage Collection (also referred to herein as "GC") is a form of automatic memory management. Automatic garbage collection is the process of examining the heap memory, identifying the data objects that are no longer used by a program and deleting the unused data object in order to reclaim the resources used (e.g., the memory occupied) by those objects. The moment when the garbage (e.g., the used up memory) is collected (e.g., the used up memory is released) may be unpredictable and may result in stalls scattered throughout a session. Unpredictable stalls may be problematic in real-time environments, in transaction processing, or in interactive programs. Data that pertains to stall times and other garbage collection statistics may be accessed at the garbage collection analyzing system 207 and used in evaluating the garbage collection performance of a service by the change evaluating system 203.

For example, every Java process dumps a log called the GC log. The GC log may be used to analyze the garbage collection performance of a service. The garbage collection analyzing system 207 may collect and parse GC logs from numerous services within the environments of a company to identify GC events. Upon identifying the GC events, the garbage collection analyzing system 207 may categorize and persist each garbage collection event in a database. In addition, the garbage collection analyzing system 207 may retrieve and analyze garbage collection data based on a particular service instance or based on a plurality of service instances. Based on the analysis of the garbage collection data, the garbage collection analyzing system 207 may generate a number of garbage collection metrics. Examples of garbage collection metrics are: type of event; minor/major GC time; GC failures and cause of failure; system and user CPU utilization; memory footprints; memory freed per collection; young generation, old generation, and permanent generation memory utilization; survivor ages and memory occupancies; heap growth; full garbage collector; garbage collectors with failures; Input/Output (also "I/O") and memory starved events; total stall time; stop the world stall times; event time range; collection times and heap statistics for different spaces or generations; time until heap exhaustion; allocation rate; promotion rate; survivor death ratio and occupancy; etc. The garbage collection analyzing system 207 may store the garbage collection metrics in the GC metrics database 208.

Other automated systems, such as the change evaluating system 203, the ticketing system 211 or the alert system 213, or a variety of troubleshooting tools may be consumers of data that pertains to garbage collection performance of services within the environments of a company. For example, as discussed above, the change evaluating system 203 may communicate with the garbage collection analyzing system 207 to access performance data (e.g., garbage collection data) for a particular service. The garbage collection data may be stored in the GC metrics database 208. The garbage collection data (e.g., GC metrics) may be used by the change evaluating system 203 during the evaluation of the performance (e.g., GC performance) of the service after a change. This may allow for proactive monitoring of GC for a service to predict GC issues before they happen in other environments. Furthermore, based on the evaluation of the GC performance of a service, the change evaluating system 203 may provide a recommendation for GC settings and steps to remediate GC problems.

The change evaluating system 203 may automatically identify GC-related problems based on rules or heuristics. The ticketing system 211 may open a ticket based on the evaluation result generated by the change evaluating system 203. The alert system 213 may generate a communication including an alert based on a determination (e.g., by the change evaluating system 203) that one of the GC metrics is outside a pre-determined range of values.

The GC metrics may also be accessed by a client device of a user of the garbage collection analyzing system 207 in response to a request by the user for one or more GC metrics. For example, in response to receiving a request that specifies the name of a service and a time range, the garbage collection analyzing system 207 may provide one or more metrics that pertain to the garbage collection performance of the particular service for the specified time range.

Redline Monitoring System

The redline monitoring system 209 is a tool for capacity planning which automatically identifies the redline throughput for services in production. The redline throughput of a service instance is the maximum throughput that a service instance may handle without compromising performance, user experience, stability of the site, or availability under the current capacity. A benefit of the redline monitoring system 209 is the ability to monitor any changes in the capacity level of a service in response to a change in software or hardware that pertains to the service. For example, as new software code is being rolled out, the redline monitoring system 209, using live traffic, tests a particular service's ability to have the same capacity level under the new software code as the service's baseline capacity level (e.g., determined based on a previous version of the code).

Traditionally, the capacity of a service may be tested using a simulated stress test in a test environment. For example, a stress test may be performed by increasing the number of requests for a service in some simulated fashion until the process or system cannot handle the requests. The redline monitoring system 209 automates the stress test and performs it on a live (e.g., production) system. After a particular change, the redline monitoring system 209 may funnel live traffic to a particular service in the production environment and monitor the performance of the service as the service is being stressed. This process may allow the redline monitoring service 209 to determine the point (or conditions) when the service begins to degrade. The redline capacity value (e.g., the QPS) may be determined at the point of service degradation and may be represented by an integer number.

In some example embodiments, the redline monitoring system 209 determines a redline capacity metric for every service of a plurality of services. The redline capacity metric may be integrated into the capacity planning and modeling process. The redline testing may be incorporated in various example embodiments to track and reflect the capacity changes (or impact) of software code changes. The redline monitoring system 209 may perform continuous analysis and generation of redline metrics. The redline monitoring system 209 may also be invoked on-demand by a user to test a particular service. Also, the redline monitoring system 209 may be invoked automatically upon a listener component of the redline monitoring system 209 receiving a software release notification (e.g., a newly deployed service or an existing service using a new software version).

In some example embodiments, when the redline monitoring system 209 is invoked, the redline monitoring system 209 accesses a data source to obtain the baseline redline capacity value for a particular service and engages the particular service to start. The redline monitoring system 209 funnels live traffic to the machine running the service to attempt to increase the QPS value to the baseline redline capacity level. While attempting to increase the QPS value to the baseline redline capacity level, the redline monitoring system 209 monitors activities that indicate actual or possible performance problems related to the particular service or machine running the service (e.g., latency, exceptions, GC behavior, system availability, etc.) In some example embodiments, the redline monitoring system 209 may evaluate the activities that indicate performance problems and any available metrics that pertain to those activities, and may determine a new redline capacity value based on determining that at least one of the activities indicates a capacity problem. In various example embodiments, this functionality is performed by the change evaluating system 203 in response to a request for evaluation of redline capacity data by the redline monitoring system 209. The change evaluating system 203 may issue an evaluation result of "pass" if the new redline capacity number is equal to or greater than the baseline capacity number. Alternatively, the change evaluating system 203 may generate a "fail" evaluation result if the new redline value is lower than the baseline capacity value. In some example embodiments, an alert may be sent when the new redline number is below the baseline redline number.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
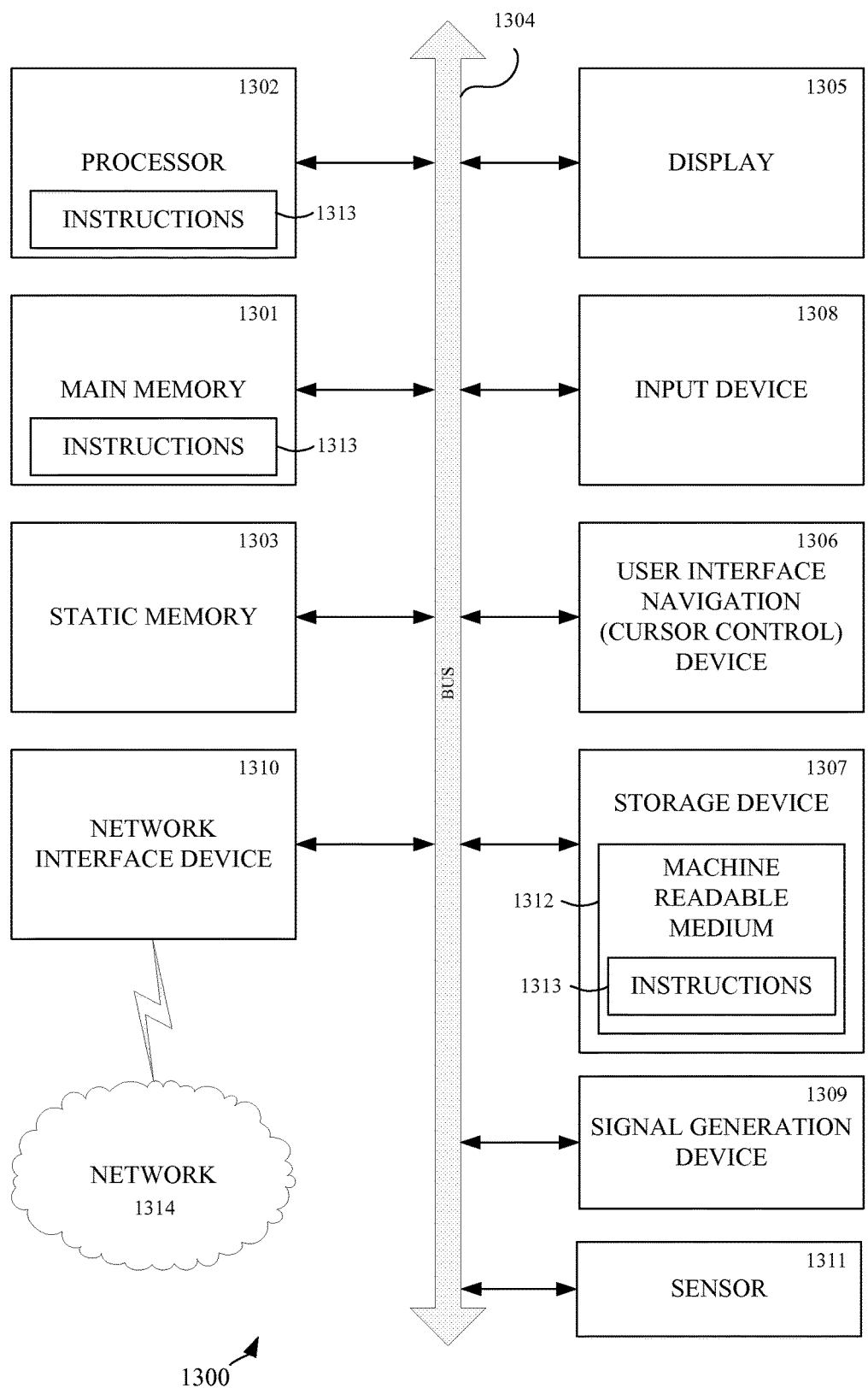
FIG. 13 is a block diagram of a machine in the example form of a computer system within which a set of instructions, for causing the machine to perform any one or more of the methodologies discussed herein, may be executed.

FIG. 13 is a block diagram of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1301 and a static memory 1303, which communicate with each other via a bus 1304. The computer system 1300 may further include a video display unit 1305 (e.g., a liquid crystal display (LCD) or a cathode ray tube (CRT)). The computer system 1300 also includes an alphanumeric input device 1308 (e.g., a keyboard or a touch-sensitive display screen), a user interface (UI) navigation device 1306 (e.g., a mouse). The computer system 1300 may additionally include a storage device 1307 (e.g., drive unit), a signal generation device 1309 (e.g., a speaker), a network interface device 1310, and one or more sensors 1311, such as a global positioning system sensor, compass, accelerometer, or other sensor.

Machine-Readable Medium

The drive unit 1307 includes a machine-readable medium 1312 on which is stored one or more sets of instructions and data structures (e.g., software 1313) embodying or utilized by any one or more of the methodologies or functions described herein. The instructions 1313 may also reside, completely or at least partially, within the main memory 1301 and/or within the processor 1302 during execution thereof by the computer system 1300, the main memory 1301 and the processor 1302 also constituting machine-readable media.

While the machine-readable medium 1312 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1313 may further be transmitted or received over a communications network 1314 using a transmission medium. The instructions 1313 may be transmitted using the network interface device 1310 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Win® and WiMax® networks). The term "transmission medium" shall be taken to include any intangible medium that is capable of storing, encoding or carrying instructions for execution by the machine, and includes digital or analog communications signals or other intangible media to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   accessing exception data of an exception that occurred on a machine, the exception data including a stack trace of the exception;
   determining that the exception is unique based on the stack trace of the exception, the determining that the exception is unique including:
      removing dynamic data from the stack trace of the exception to result in a stripped stack trace of the exception,
      applying a hash function to the stripped stack trace to calculate a particular primary hash code that uniquely identifies the stripped stack trace of the exception,
      accessing one or more primary hash codes stored in a record of a database,
      comparing the particular primary hash code against the one or more primary hash codes, and
      determining that the particular primary hash code is not included in the one or more primary hash codes;
   responsive to the determining that the exception is unique, performing a first categorizing, using one or more hardware processors, of the exception into one or more categories based on the stack trace of the exception;
   removing additional data from the stripped stack trace of the exception to result in a twice-stripped stack trace of the exception;
   applying the hash function to the twice-stripped stack trace to calculate a particular secondary hash code associated with the exception; and
   performing a second categorizing of the exception into the one or more categories based on the particular secondary hash code associated with the exception.

2. The method of claim 1, wherein the exception data includes:
   an identifier of the machine where the exception occurred;
   a timestamp that identifies a time when the exception occurred; and
   the stack trace of the exception.

3. The method of claim 1, wherein the performing of the first categorizing of the exception into the one or more categories based on the stack trace of the exception includes:
   identifying an exception count associated with the particular primary hash code; and
   increasing the exception count associated with the particular primary hash code by one based on the exception being associated with the particular primary hash code, the exception count associated with the particular primary hash code indicating a number of exceptions being associated with the particular primary hash code.

4. The method of claim 3, wherein the exception count associated with the particular primary hash code is stored in association with an exception category identifier, with the stripped stack trace, and with the particular primary hash code in the record of a database, the exception category identifier identifying an exception category corresponding to the particular primary hash code of the exception.

5. The method of claim 1, further comprising:
storing the particular secondary hash code in association with an exception category identifier, with the stripped stack trace, and with the particular primary hash code in the record of a database.

6. The method of claim 1, wherein the performing of the second categorizing of the exception into the one or more categories based on the particular secondary hash code associated with the exception includes:
identifying an exception count associated with the particular secondary hash code; and
increasing the exception count associated with the particular secondary hash code by one based on the exception being associated with the particular secondary hash code, the exception count associated with the particular secondary hash code indicating a number of exceptions being associated with the particular secondary hash code.

7. The method of claim 1, wherein the performing of the first categorizing of the exception into the one or more categories based on the stack trace of the exception comprises:
categorizing the exception based on an identifier of the machine where the exception occurred.

8. The method of claim 7, wherein the categorizing of the exception based on the identifier of the machine includes:
determining the identifier of the machine based on the exception data of the exception;
identifying an exception count associated with the machine based on the identifier of the machine and the stack trace of the exception; and
increasing the exception count associated with the machine by one based on the exception occurring on the machine, the exception count associated with the machine indicating a number of times the exception occurred on the machine.

9. The method of claim 8, wherein the identifying of the exception count associated with the machine includes:
determining that the exception count associated with the machine does not exist; and
generating the exception count associated with the machine.

10. The method of claim 1, wherein the performing of the first categorizing of the exception into the one or more categories based on the stack trace of the exception comprises:
categorizing the exception based on a timestamp that identifies when the exception occurred.

11. The method of claim 10, wherein the categorizing of the exception based on the timestamp includes:
determining the timestamp based on the exception data of the exception;
identifying an exception count associated with the timestamp; and
increasing the exception count associated with the timestamp by one based on the exception occurring at the timestamp, the exception count associated with the timestamp indicating a number of times the exception occurred at the timestamp.

12. The method of claim 1, wherein the performing of the first categorizing of the exception into the one or more categories based on the stack trace of the exception comprises:
categorizing the exception based on an exception type that identifies a type of the exception.

13. The method of claim 12, wherein the categorizing of the exception based on the exception type includes:
determining the exception type based on the exception data of the exception;
identifying an exception count associated with the exception type; and
increasing the exception count associated with the exception type by one based on the exception being of the exception type, the exception count associated with the exception type indicating a number of times exceptions of the exception type occurred.

14. The method of claim 1, further comprising:
receiving a request for an exception report, the request being from a device of a user; and
in response to the request, generating the exception report including a categorization of the exception.

15. The method of claim 14, wherein the request for the exception report includes a categorization criterion, and
wherein the performing of the first categorizing of the exception into the one or more categories based on the stack trace of the exception is further based at least in part on the categorization criterion included in the request.

16. The method of claim 14, wherein the request for the exception report specifies a time range, and
wherein the performing of the first categorizing of the exception into the one or more categories based on the stack trace of the exception is further based at least in part on the time range specified in the request.

17. A system comprising:
a non-transitory machine-readable medium for storing instructions that, when executed by one or more hardware processors, cause the one or more hardware processors to perform operations comprising:
accessing exception data of an exception that occurred on a machine, the exception data including a stack trace of the exception;
determining that the exception is unique based on the stack trace of the exception, the determining that the exception is unique including:
removing dynamic data from the stack trace of the exception to result in a stripped stack trace of the exception,
applying a hash function to the stripped stack trace to calculate a particular primary hash code that uniquely identifies the stripped stack trace of the exception,
accessing one or more primary hash codes stored in a record of a database,
comparing the particular primary hash code against the one or more primary hash codes, and
determining that the particular primary hash code is not included in the one or more primary hash codes;
responsive to the determining that the exception is unique, performing a first categorizing of the exception into one or more categories based on the stack trace of the exception
removing additional data from the stripped stack trace of the exception to result in a twice-stripped stack trace of the exception;
applying the hash function to the twice-stripped stack trace to calculate a particular secondary hash code associated with the exception; and
performing a second categorizing of the exception into the one or more categories based on the particular secondary hash code associated with the exception.

18. A non-transitory machine-readable storage medium comprising instructions that, when executed by one or more hardware processors of a machine, cause the one or more hardware processors to perform operations comprising:

accessing exception data of an exception that occurred on a machine, the exception data including a stack trace of the exception;

determining that the exception is unique based on the stack trace of the exception, the determining that the exception is unique including:

removing dynamic data from the stack trace of the exception to result in a stripped stack trace of the exception, applying a hash function to the stripped stack trace to calculate a particular primary hash code that uniquely identifies the stripped stack trace of the exception, accessing one or more primary hash codes stored in a record of a database, comparing the particular primary hash code against the one or more primary hash codes, and determining that the particular primary hash code is not included in the one or more primary hash codes;

responsive to the determining that the exception is unique, performing a first categorizing of the exception into one or more categories based on the stack trace of the exception removing additional data from the stripped stack trace of the exception to result in a twice-stripped stack trace of the exception;

applying the hash function to the twice-stripped stack trace to calculate a particular secondary hash code associated with the exception; and performing a second categorizing of the exception into the one or more categories based on the particular secondary hash code associated with the exception.

* * * * *

UNITED STATES PATENT AND TRADEMARK OFFICE
CERTIFICATE OF CORRECTION

PATENT NO. : 9,852,041 B2  
APPLICATION NO. : 14/042461  
DATED : December 26, 2017  
INVENTOR(S) : Baggott et al.

Page 1 of 1

It is certified that error appears in the above-identified patent and that said Letters Patent is hereby corrected as shown below:

On the Title Page

On page 2, in Column 1, item (56) under "Other Publications", Line 3, delete "Resonse" and insert --Response-- therefor In the Claims In Column 34, Line 58, in Claim 17, after "exception", insert --;--

In Column 36, Line 8, in Claim 18, after "exception", insert --;--

Signed and Sealed this  
Fourth Day of June, 2019

Andrei Iancu  
*Director of the United States Patent and Trademark Office*